April 1, 1958 V. W. BOLIE 2,829,255

DIGITAL FREQUENCY SYNTHESIZER SYSTEM

Filed Oct. 10, 1955 6 Sheets-Sheet 1

INVENTOR.
VICTOR W. BOLIE

BY Moody and Goldman

ATTORNEYS

INVENTOR.
VICTOR W. BOLIE
BY Moody and Goldman
ATTORNEYS

INVENTOR.
VICTOR W. BOLIE
BY Moody and Goldman
ATTORNEYS

INVENTOR.
VICTOR W. BOLIE
BY Moody and Goldman
ATTORNEYS

DIGITAL FREQUENCY SYNTHESIZER SYSTEM

Filed Oct. 10, 1955 6 Sheets-Sheet 5

INVENTOR.
VICTOR W. BOLIE
BY Moody and Goldman
ATTORNEYS

INVENTOR.
VICTOR W. BOLIE
BY Moody and Goldman
ATTORNEYS

United States Patent Office 2,829,255

Patented Apr. 1, 1958

2,829,255

DIGITAL FREQUENCY SYNTHESIZER SYSTEM

Victor W. Bolie, Cedar Rapids, Iowa, assignor to Collins Radio Company, Cedar Rapids, Iowa, a corporation of Iowa Application October 10, 1955, Serial No. 539,351

43 Claims. (Cl. 250—36)

This invention relates generally to frequency synthesizers and particularly to a frequency synthesizer system that can utilize a single frequency to provide an output which is variable in increments that can be made as small as required over a frequency range which can be made as large as required.

For example, using the stabilized frequency of a single piezoelectric crystal, the invention can provide an output having a range of many megacycles, and the output can vary in digital steps which are spaced only by a fraction of a cycle. Thus, the invention may use a single crystal to provide a wide-range output that may be considered for many practical purposes as infinitely variable.

It is therefore an object of this invention to provide a frequency synthesizer that may obtain virtually crystal stability for every frequency within its range.

It is another object of this invention to provide a frequency synthesizer that can have a control dial indication that exactly indicates the output frequency of the synthesizer to as many digital places as required.

It is still another object of this invention to provide a frequency synthesizer system that may have its output calibrated directly in any digital system, such as binary, ternary, decade, etc., without any requirement for coding and decoding.

It is yet another object of this invention to provide a frequency synthesizer system that may avoid complex filters and may use commonly available L–C filters, which need not have an unusually high Q.

It is another object of this invention to provide a frequency synthesizer system that can avoid low order spurious frequencies to thereby decrease the filter requirements of the system.

It is a further object of this invention to provide a frequency synthesizer system that permits module construction of its component units.

It is a still further object of this invention to provide a frequency synthesizer system which permits many of its component units to be constructed identically to thus decrease design problems and simplify manufacture.

It is a yet further object of this invention to provide a frequency synthesizer in which component units may be easily added to increase its frequency range and/or to decrease the increment between adjacent frequencies within the frequency range.

In this specification, the specifically described embodiments of the invention will include synthesizers using the decade number system and the binary number system but will stress primarily the use of the decade number system, which is most commonly known. However, the invention is not restricted to the binary and decade number systems and equally applies to a numerical system having any radix, such as for example the ternary system which has a radix of three. It will be apparent, after thorough study of this specification, how any radix may be used in the invention.

The single frequency utilized by the invention to generate its variable output frequencies is called herein the "standard frequency." The standard frequency may be obtained, when desired, from any of its multiples or divisibles; and, for example, a standard frequency of 100 kilocycles may be obtained from a 2500 kilocycle source by dividing the source frequency by twenty-five.

In order to obtain direct calibration in any numerical system, the "standard frequency" must be an integer power of the radix of the chosen number system. For example, in the decade system, it is necessary to use a standard frequency that is an integer power of ten; while, on the other hand, in the binary system the standard frequency should be an integer power of two; and in a ternary system, the standard frequency should be an integer power of three, etc.

It is conceivable, however, that where digital calibration is not required, the standard frequency may be arbitrary and may not even be an integer.

The output frequency range of the invention may vary between limits that may be widely spaced or narrowly spaced, as desired; and the limits may be defined by the following expression:

$$\text{Output frequency range} = R^z M \text{ to } R^z(M+1) \quad (1)$$

where R is the radix of a chosen number system, $z$ is any integer power, and M is likewise any integer including zero. Numbers $z$ and M are chosen by design considerations according to the output range desired from a given embodiment of the invention.

Basically, the invention requires only a single set of harmonic frequencies to be obtained from the standard frequency. A harmonic is called herein by its multiple of the standard frequency. The number of harmonics in a set will vary from R to 2R depending on the choice of the value of M in expression (1). The harmonics in a set will be within the following limits:

$$\text{Limiting Harmonics in a set} = M(R-1) \text{ through } (M+1)R-1 \quad (2)$$

where the terms are defined above. Not all of the harmonics within the limits of expression (2) will be used however when M is large.

For example, if M is chosen to be zero in the decade system where R is ten, the harmonics will range from zero through none. The zero harmonic is no frequency or signal, while the first harmonic is the frequency standard; and the remaining harmonics are given by their multiples of the standard frequency. However, it is often desirable for M not to be zero, because of the filtering problems encountered in the circumstance. When M is one for the decade system, the set of harmonics is from the ninth through the nineteenth. And when M is thirty-five in the decade system, the limiting harmonics are the 315th and 359th; but only twenty harmonics will be used within the limits, and they will be between the 315th and the 359th, as will be explained in the next paragraph.

The discrete frequencies that occupy the output frequency range defined by expression (1) may be stated generically by the following expression, which was obtained by analysis of the operation of the invention:

$$f_{out} = \left( \ldots (((R f_{a \ldots k} + f_{a \ldots k}) R + f_{a \ldots k}) R + f_{a \ldots k}) R + f_{a \ldots k} \frac{1}{R}\left(f_{a \ldots k} + \frac{1}{R}\left(f_{a \ldots k} + \frac{1}{R}\left(f_{a \ldots k} + \frac{1}{R} f_{a \ldots t}\right)\right)\right) \ldots \right) \quad (3)$$

where $f_{out}$ is any discrete output frequency; R is the radix of the chosen numeral system; $f_{d \ldots t}$ is any one of R number of consecutive harmonic frequencies in which the highest harmonic frequency is defined as $(M+1)R-1$ which is given above in expression (2) as the upper limiting value; and $f_{a \ldots k}$ represents any one of R number of consecutive harmonic frequencies in which the lowest harmonic frequency is defined as $M(R-1)$ thich is stated above in expression (2) as the lower limiting value.

It has been found that expression (3) may be expanded to provide the following type of series:

$$N=R^{n}S_{a \ldots g}+\ldots+R^{2}S_{a \ldots g}+RS_{a \ldots g}+S_{a \ldots g}+\frac{S_{a \ldots g}}{R}+\frac{S_{a \ldots g}}{R^{2}}+\ldots+\frac{S_{a \ldots g}}{R^{k}} \quad (4)$$

where N is a number suitable for digital representation; R is the radix; $S_{a \ldots g}$ is any one of the basic digits in the number system having the radix R, and $n$ and $k$ are the limiting integer powers of the series.

It is the last term in expression (4) that determines the smallest increment between adjacent numbers N; and a mathematical expansion of expression (3) will show the increment between adjacent frequencies of $f_{out}$ is determined by the product of all of the $$\frac{1}{R}$$

factors occurring in expression (3) multiplied by the chosen standard frequency. This may be expressed mathematically as follows:

$$\text{Increment between adjacent frequencies}=\frac{R^{s}}{R^{k}}=R^{(s-k)} \quad (5)$$

where $R^{s}$ will be the standard frequency of a particular system, and $k$ will be the number of dividing digital units. Both of these terms will be explained below.

The invention may have a "source component unit" that generates a chosen standard frequency and a chosen set of harmonic frequencies. The invention may further have a plurality of "digital component units" that are each connected to receive the set of harmonics provided from the source component unit. Each digital component unit selects one harmonic from the set according to the setting of its dial; and in combination, the component units can synthesize any frequency in the output frequency range according to the settings of a directly readable dial system. Each digital component unit provides one digit of the output frequency in terms of the chosen numeral system; and that digit is directly indicated on the dial of the unit.

The first digital component unit selects, according to its dial setting, a harmonic from the group $f_{d \ldots t}$ (defined in connection with expression (3) above) and scales (divides) it frequency-wise by the given radix R. A second digital component unit receives the output of the first unit in a mixer circuit, which also receives, according to the unit's dial setting, one of the harmonics from the group $f_{a \ldots k}$ to provide a summed output, which is scaled (divided) frequency-wise by the given radix. The output of the second unit is fed to the mixer in a third digital component unit which may be identical to the second unit; and similarly, fourth, fifth, etc. digital component units may be connected in the system, where each may be identical to the second unit.

All digital component units having a frequency divider, that scales by the given radix, are generically called herein as "dividing digital component units." The number of dividing component units determines the increment between adjacent output frequencies; and every time another dividing unit is added, the digital increment decreases by a factor of $$\frac{1}{R}$$

Thus, the increment among the output frequencies may be readily decreased to a point that is below the stability factor of the standard frequency, which provides a practical limit that, on the other hand, is not a theoretical limit.

When divider component units are solely used, the output frequency range is generally limited by expression (1) to the situation where $R^{z}$ equals the given standard frequency.

However, the output frequency range may be extended by a factor of R by adding one of another type of component unit called herein a "neutral digital component unit" because it does not have a frequency divider. Also, the output frequency range may be further extended to any value by adding any number of still another type of component unit called herein a "multiplier digital component unit," because each of them contains a frequency multiplier.

A "neutral digital component unit" has a mixer that receives one input from the adjacent dividing component unit and receives another input from the harmonic group, $f_{a \ldots k}$, according to its dial setting. A filter is included to select an output frequency which is the sum of the two input frequencies.

"Multiplying digital component units" may be used following the "neutral digital component unit" whereby each multiplying unit provides another whole number digit to the output frequency rather than a fractional digit as was done by each dividing unit. Each multiplying digital unit contains a frequency multiplier that multiplies a harmonic selected from the group, $f_{a \ldots k}$, by the radix taken to an integer power. The multiplied harmonic is then mixed with the output frequency of the adjacent prior digital unit; and the sum of the two inputs provides the output frequency of the multiplying unit.

Basically, all of the multiplying component units are similar except that the frequency multiplier provides a different multiplication factor in each unit, which was not the case with dividing component units, and the frequency ranges are different for each unit, which also was not the case with the dividing component units.

Suitable filters are required in each of the component units to select the desired sum frequency from the component unit mixer and to suppress undesired spurious response.

Another important factor in determining the output stability of a frequency synthesizer is the spurious response. In the invention, spurious response becomes smaller as the standard frequency becomes larger. For example, in one embodiment of the invention using a 100 kilocycle crystal as the standard frequency, it was found that the first through fifth order spurious response was not within 100 kilocycles of the output frequency of any component unit. Therefore, filters used to construct the invention may have a relatively low Q.

Further objects, features, and advantages of this invention will be apparent to a man skilled in this art after thorough study of this specification and drawings, in which.

Figure 1:
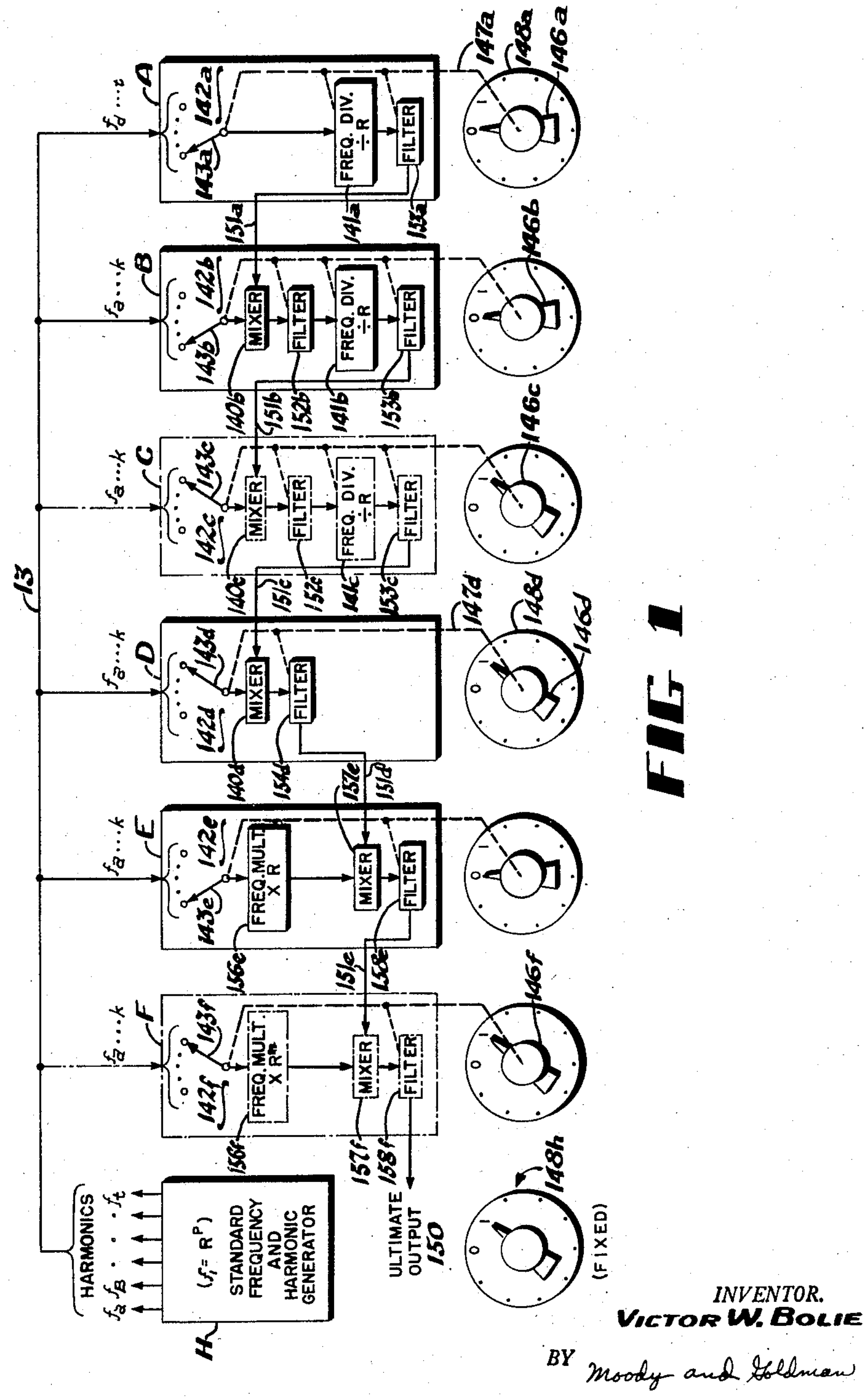
Figure 1 represents a generic form of the invention.
Figure 2:
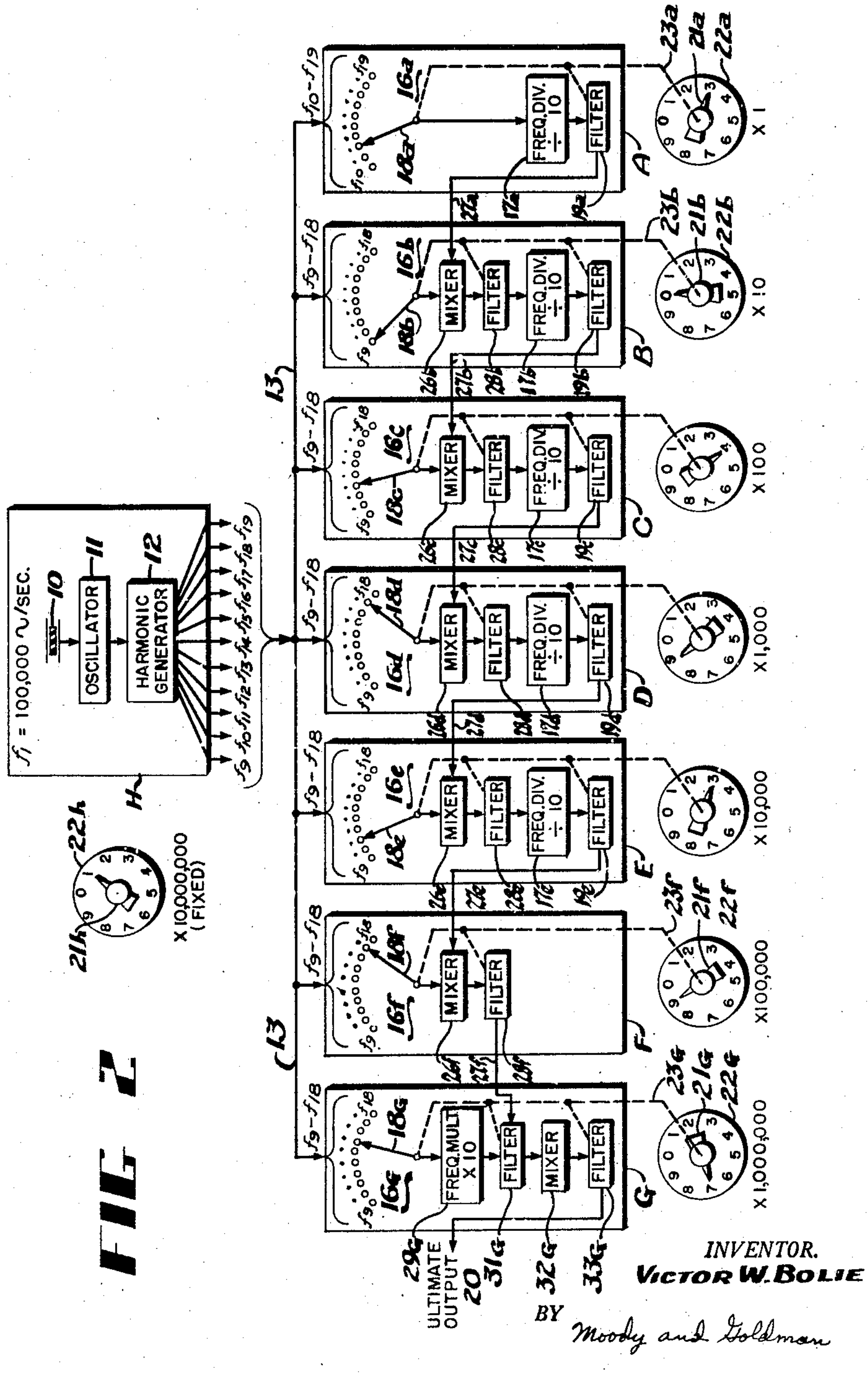
Figure 2 is a diagram of a decade form of the invention.
Figure 3:
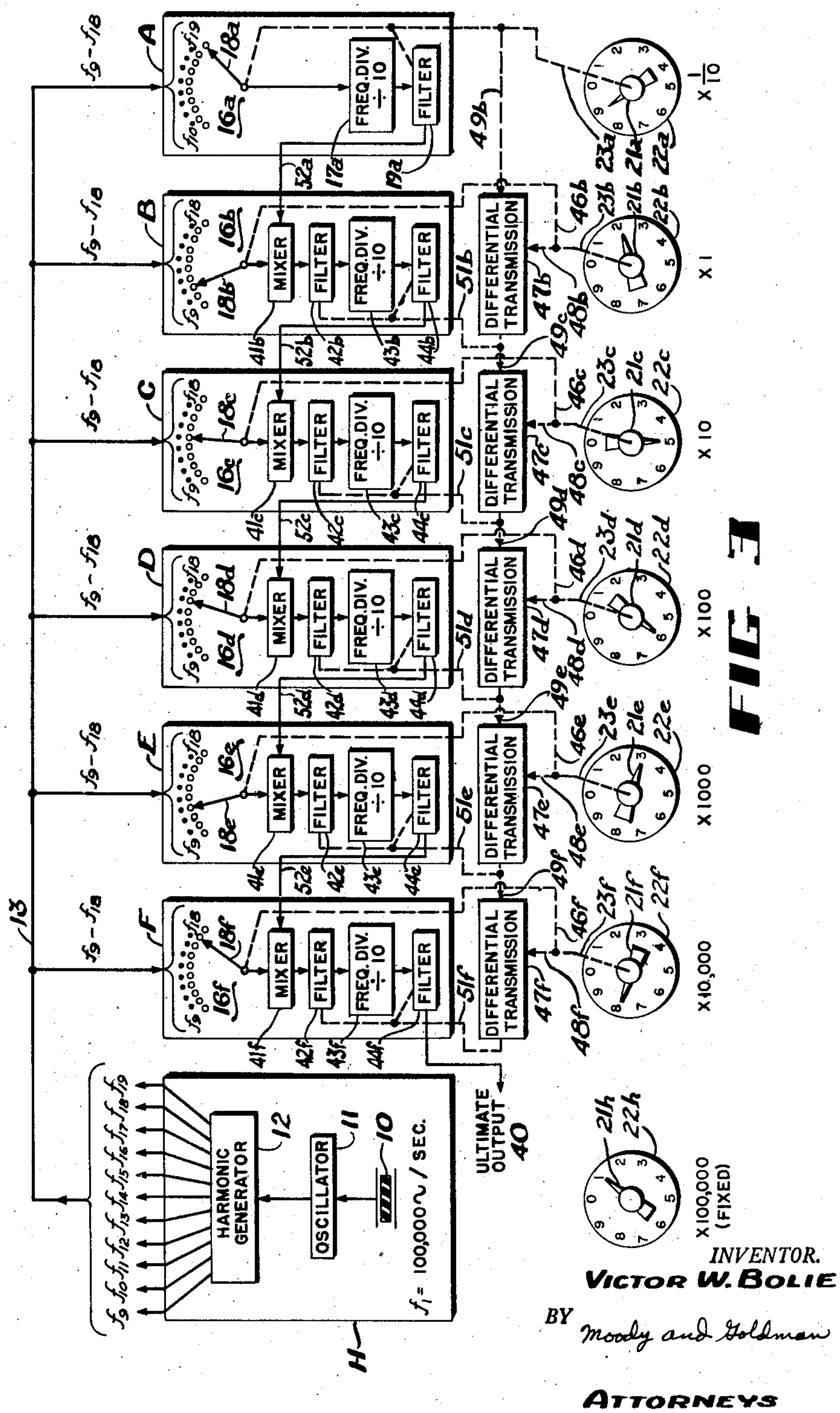
Figure 3 is a block diagram of another decade form of the invention that includes a precise means for tuning filters.
Figure 4:
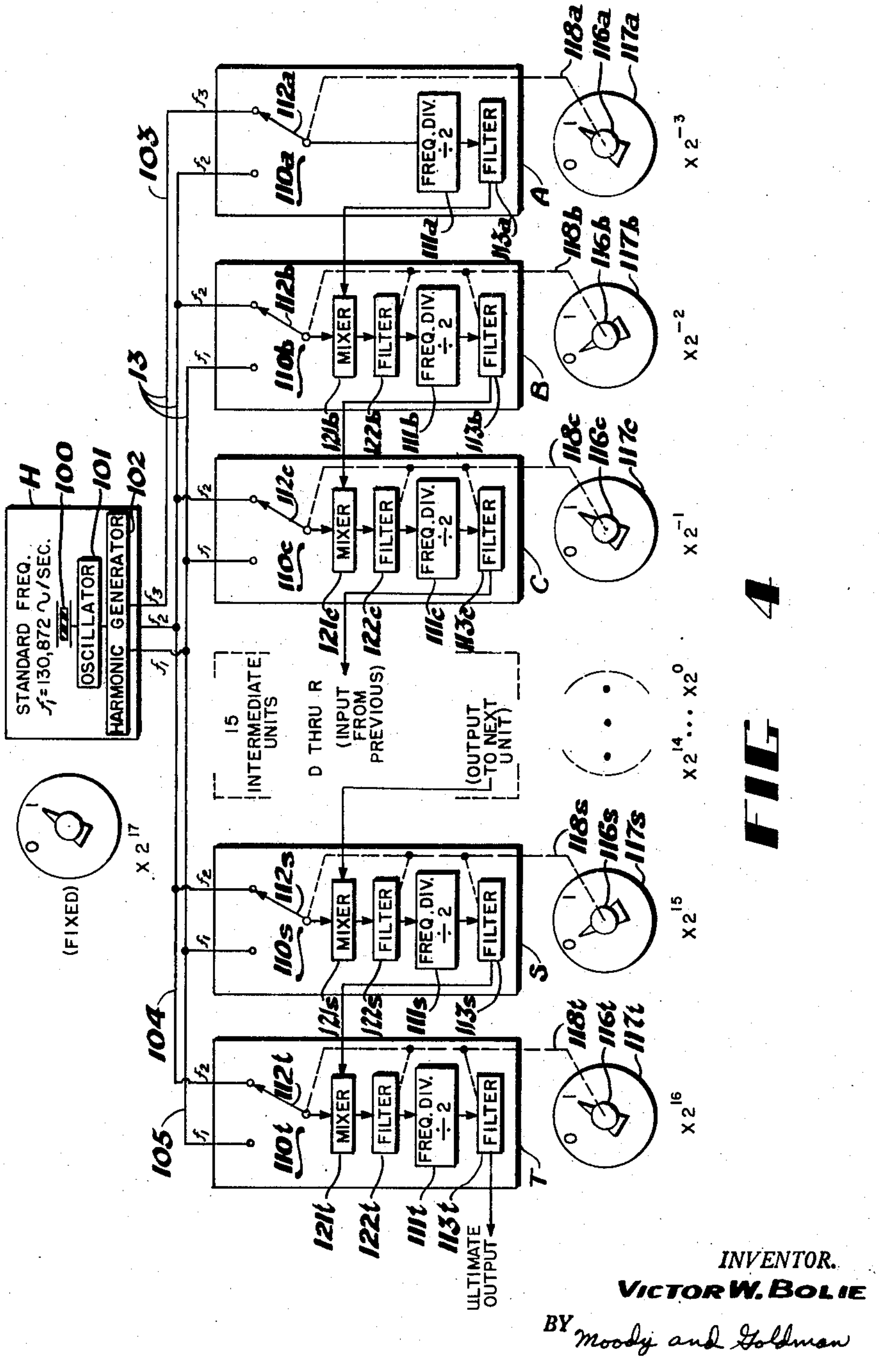
Figure 4 represents a binary form of the invention.

In the drawings, Figure 1 shows the most general form of the invention, which may use any radix. Figures 2 and 3 illustrate decade synthesizers. The synthesizer in Figure 3 can provide exact tuning for its filter circuits; while the synthesizer in Figure 2 provides compromise tuning. Figure 4 illustrates a binary synthesizer.

Referring now to Figure 2 a source component unit H generates a set of harmonics for a decade system form of the invention, wherein M in expression (1) is chosen to be the numeral one. Then, the harmonic set is defined by expression (2) to include harmonics nine through nineteen, designated as $f_9$ through $f_{19}$. Unit H contains a crystal 10 which operates with an oscillator 11 to provide the standard frequency for the system in Figure 2 and which might resonate at a fundamental frequency of 100 kilocycles per second, designated as frequency $f_1$.

A harmonic generator 12 is connected to the output of oscillator 11 and contains a non-linear element and frequency sensitive means for selecting the harmonic set having the eleven harmonics $f_9$ through $f_{19}$, which range from 900 kilocycles to 1900 kilocycles, inclusive. The eleven harmonics are connected separately to an individual bus wire indicated, for simplicity, by single-line bus representation 13 in Figure 2. The respective bus wires in bus representation 13 are shielded from each other to prevent mutual coupling. Many conventional crystal oscillator and harmonic generators are available to satisfy the circuit requirements of harmonic component unit H. The harmonic generator 12 may contain additional amplifiers; and the output harmonics $f_9$–$f_{19}$ are preferably, although not essentially equalized in amplitude.

A plurality of digital component units A, B, C, D, E, F, and G are provided which connect to the buses 13. Many of the elements in the different component units may be identical in circuitry; and therefore similar items are designated by the same reference numeral but with a letter indication that corresponds to the digital unit in which they reside. Thus, each of the digital units has a single-pole ten-throw switch 16.

Switch **16*a* in first digital component unit A has its ten contact terminals connected respectively to the buses carrying harmonics $f_{10}$ through $f_{19}$ in bus representation 13. Each of the remaining digital component units B through G has its ten contacts connected respectively to the buses carrying harmonics $f_9$ through $f_{18}$ in bus representation 13**.

The respective switch-bus connections are indicated by braces to prevent undue complication of the drawings.

First component unit A has a frequency divider **17*a*, which divides a received frequency by ten, the radix of the system. The input to divider 17*a* is connected to the pole 18*a* of switch 16*a* and therefore receives a selected one of the frequencies $f_{10}$ through $f_{19}$ according to the setting of pole 18*a***.

A filter **19*a* is connected to the output of divider 17*a*. It passes only the fundamental frequency of the divider output and therefore sharply attenuates output harmonics and spurious response, where the type of frequency divider used provides such spurious output. Since the lowest output frequency from divider 17*a* is 100 kilocycles (since $f_{10}$ is one megacycle), and since the harmonics are spaced by 100 kilocycle increments, it is noted that there are no stringent requirements on filter 19*a***. The frequency spacing between the suppressed harmonics increases from the 100 kilocycle minimum to a maximum of 190 kilocycles for the highest output frequency.

Divider **17*a* may be constructed in any one of many well known manners which may employ multivibrators, blocking oscillators, gas-triode oscillators, regenerative frequency dividers, and many others. (See "Radio Engineering" by F. E. Terman, third edition, pages 586–596.) Where a particular type of divider, such as a regenerative frequency divider, has a tuned output, then filter 19*a* will be inherent in divider 17*a***.

A knob **21*a* provides the digital setting for first unit A and has ten rotational positions, which are designated on a dial plate 22*a* as the basic digits in the decade system, 0 through 9. In the system of Figure 2, the settings of knob 21*a* vary the ultimate output frequency 20 of the system in one cycle per second increments, as is indicated by the X1 sign adjacent to dial 22*a***.

A shaft means **23*a* is mechanically connected to and rotated by knob 22*a*. Shaft means 23*a* also is connected to pole 18*a* of switch 16*a* and to filter 19*a* so that they can be controlled by knob 22*a*. Each of the ten settings of knob 22*a*, indicated as zero through nine, respectively connects the divider input to one of the frequencies $f_{10}$ through $f_{19}$ and, at the same time, tunes filter 19*a* to the fundamental output frequency of divider 17*a***, which is 1/10 of the selected harmonic frequency.

Second digital component unit B has a mixer **26*b* that receives the output from first component unit A by a lead 27*a* that is connected to first filter 19*a*. Mixer 26*b* also receives as a second input a selected one of the frequencies $f_9$ through $f_{18}$ by means of the pole 18*b*** of a ten terminal switch that has its terminals respectively connected to the buses carrying harmonics $f_9$ through $f_{18}$.

A filter **28*b* connects to the output of mixer 26*b* and selects the summed output of the two input frequencies. Hence, one mixer input frequency, which is a selected harmonic frequency will range from 900 to 1800 kilocycles and the other mixer input frequency received from first unit A will range from 100 to 200 kilocycles. Thus, the summed mixer output frequencies, which are discrete frequencies, will have a minimum spacing of 100 kilocycles, which is obtained when the input frequency equals 900 kilocycles and 100 kilocycles. These minimum mixer input frequencies provide as second order mixer output frequencies, the sum frequency of 1,000 kilocycles, the difference frequency of 800 kilocycles, and the center frequency of 900 kilocycles. Hence, there are no stringent requirements on filter 28*b*** to separate the sum frequency from either the center frequency or the difference frequency; and accordingly, no balanced modulator is required to suppress the center frequency.

A frequency divider **17*b*, that also divides by ten and may be identical to the frequency divider 17*a* used in the first component unit, is connected to the output of filter 28*a*; and if necessary, the output of divider 17*b* is passed through another filter 19*b***, since many types of dividers provide pulsed outputs that are rich in harmonics.

A second knob **21*b* is connected by a shaft 23*b* to switch pole 18*b* and filters 28*b* and 19*b*. Second knob 21*b* may be set to any one of ten positions designated on dial plate 22*b* as zero to nine. The adjacent settings of knob 21*b* vary the ultimate output frequency 20 of the system in Figure 2 by increments of 10 cycles per second, which are indicated by the X10 designation below dial plate 22*b***.

Also, the ten settings of second knob **21*b* tune the filters 19*b* and 28*b* to ten frequencies. Consequently, at any one setting of knob 21*b*, the tuning filters are fixed; and the mixer input frequency from switch pole 18*b* is fixed. However, the remaining mixer input from first digital unit A is not fixed by a setting of a second knob 21*b*, and the mixer output can vary in 100 kilocycle steps in response to settings of first knob 21a. For example, when pole 18b is set at contact $f_9$, the output of mixer 26b can be varied from 1000 kilocycles to 1090 kilocycles in discrete steps of ten kilocycles; and the output of frequency divider 17b accordingly is varied in discrete steps of one kilocycle. Therefore, the ten settings of filters 19b and 28b must be a compromise; and when knob 21b is set at the digit one, filter 28b may be centered at 1045 kilocycles, and filter 19b may be centered at 104.5 kilocycles. The remaining nine settings for filter 28b are preferably spaced by 100 kilocycles and will vary up to 1945 kilocycles; while the remaining nine settings of the other filter 19b will vary in ten kilocycles steps up to 194.5 kilocycles. The bandpass of filter 28b may be about 90 kilocycles, while the bandpass of filter 19b** may be about nine kilocycles.

Relatively low Q filters may be used here because, for example, on the first setting of filter 28b at 1045 kilocycles, the lowest desired mixer output is 1000 kilocycles, which is 100 kilocycles removed from the major spurious frequency of 900 kilocycles provided by harmonic $f_9$.

Furthermore, the requirements of filter 28b are not stringent, because its output is used only to actuate a frequency divider, which is actuated by the frequency having the greatest amplitude.

The other filter 19b has even less stringent requirements because it is used to attenuate harmonics provided from frequency divider 17b. The harmonics in this example will be spaced by at least 100 kilocycles, while, as stated above, only a nine kilocycle bandpass is required for filter 19b.

Third digital component unit C, fourth component unit D, and fifth digital component unit E each have components that may be identical to those in second component unit B, and they are connected as shown in Figure 2. Thus, the mixer 26c of third unit C receives the output of filter 19b in second unit B; the mixer 26d in fourth unit 26d receives the output of third unit C, and the mixer 26e in fifth unit E receives the output of fourth unit D.

Each of the digital component units C, D, and E has a knob 21 connected by a shaft means 23 to its pole 18 and filters 19 and 28 in the same manner as described for second component unit B. A dial 22 is associated with each knob 21 and is marked by the basic decade digits. A distinctive multiplication factor is marked below each dial 22 and range in sequence from X1 for the first unit A to X10,000 for the fifth unit E.

A sixth unit F is a "neutral digital component unit" and has only a ten terminal switch 16f, a mixer 26f, and a filter 28f. The terminals of the switch connect respectively to the respective buses 13 to receive frequencies $f_9$ through $f_{18}$. Switch 16f has a pole 18f that selectively connects one of the frequencies, $f_9$ to $F_{18}$, to mixer 26f, which also receives the output frequency of fifth component unit E. Filter 28f has its input connected to the output of mixer 26f and selects the frequency that is the sum of the mixer inputs.

A knob 21f having a dial 22f is provided, as was done with all proceeding units; and a shaft means 23f is connected to and rotated by knob 21f to actuate the pole 18f of switch 16f and to tune filter 28f to any one of ten compromise frequencies as described for the filters in the previous units. The compromise frequencies for filter 28f may be 1045 through 1945 kilocycles in 100 kilocycle steps, as was done with previous filters 28.

A multiplying digital component unit G receives the output of neutral unit F and provides another decade digit to the ultimate output of the system in Figure 2. Although only one multiplying digital unit is used in Figure 2, as many multiplying units may be used as are practical in a given situation; and every time another multiplying unit is added, another decade digit is added to the right of the decimal point for the ultimate output frequency 20.

Multiplying unit G in Figure 2 has a ten position switch 16g that is connected to the buses 13 in the same manner as prior neutral unit F so that the switch pole 18g can select any one of the frequencies $f_9$ through $f_{18}$.

A frequency multiplier 29g has its input connected to pole 18g and multiplier 29g multiplies the received harmonic frequency by ten times. A filter 31g is connected to the output of frequency multiplier 29g to attenuate spurious response; but if multiplier 29g provides a substantially pure output, filter 31g may not be required. A mixer 32g has one input connected to the output of filter 31g and has the other input connected to the output of neutral unit F.

Another filter 33g receives the mixer output frequency that is the sum of the two input frequencies.

The tunable parts and the switch in multiplying unit G are connected to a ten position control knob 21g by shaft means 23g, as was done in all prior units to provide a ten position arrangement. Similarly, ten compromise frequencies are required for filter 33g; but this filter will have a higher frequency range than filters in prior units, which might range in one megacycle steps from 10.5 megacycles through 19.5 megacycles.

However, first filter 31g does not require compromise tuning because it passes only one multiplied harmonic frequency for one setting of knob 21g.

Any number of multiplying units may be added after unit G, and each subsequent multiplying unit will have the multiplication factor of its frequency multiplier increase by additional factors of ten. Thus the frequency multiplier for a second multiplying digital unit will be 100 and for a third multiplying digital unit will be 1000, etc.; wherein the multiplication factor is the radix, ten, increased to a power which is the number of the particular multiplying unit.

Every multiplying digital unit wlil increase the frequency range of the output of the system by another whole number digit and thereby will add another digit to the right of the decimal point in regard to the final output frequency. Thus, the addition of each multiplying digital unit increases the range of the system by ten times.

On the other hand, the addition of dividing digital units adds another digit to the left hand side of the decimal point. Therefore, each dividing digital unit decreases the increment between ultimate output frequencies by 1/10 of the previous increment.

Since all dividing digital units except the first, are identical, their manufacture and design is greatly simplified.

A dial plate 22h is provided which has a fixed pointer 21h set at the digit 1. This results from the fact that the digit 1 was carried over from all prior units in the system, because M was chosen to be one in Figure 2, to provide the first digit on the right in the decimal representation of ultimate output frequency 20 in Figure 2. The ultimate output frequency of the system in Figure 2 may be read directly in cycles per second from dials 22 by reading their indication from left to right. Thus, the dial settings in Figure 2 indicate a frequency of 17,939,403 cycles per second.

The permuted combination of all the possible dial settings will provide the number of output frequencies, which in Figure 2 will be 10,000,000 different discrete frequencies that vary in one cycle per second steps from 10,000,000 cycles per second through 19,999,999 cycles per second.

Figure 7:
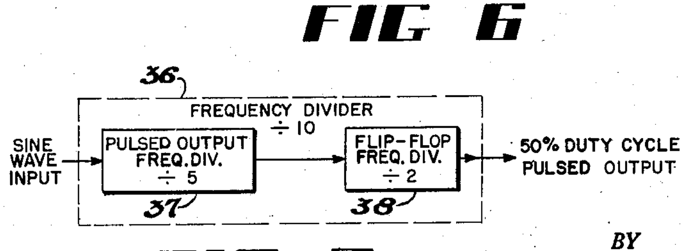
Figure 7 is a block representation of one type of frequency divider having a pulsed output which may be used with the invention.

When pulsed output frequency dividers are used in the system of Figure 2, they may be arranged as shown in Figure 7, where a decade frequency divider 36 comprises two sub-unit dividers 37 and 38 wherein the first divider 37 divides by five and the second divider 38 divides by two. The latter divider may be a multivibrator type of divider, generally known as a flip-flop circuit, which is arranged to provide an output pulse with a fifty percent duty cycle, which means that the period of each output pulse is equal to the period between adjacent pulses. The advantage of a fifty percent duty cycle is that the pulsed output will not contain even harmonics, but only odd harmonics. Consequently, with the second harmonic missing from the divider's pulsed output, the requirements of the following filter are made less stringent, since the spacing between harmonics is doubled.

The form of the invention shown in Figure 3 is a decade system generator that does not have the compromise requirements necessary with the filters in the system of Figure 2.

The embodiment shown in Figure 3 permits the use of filters having a very high Q. However, the filters still may be the simple L–C variety in which either the capacitance or the inductance element may be tunable.

The system of Figure 3 provides a mechanical differential transmission system that interconnects the various knobs and adjustable elements to permit precise control at all times over the center frequency of each tuned filter.

In Figure 3, a source unit H is provided that may be similar to source unit described in connection with Figure 2 and includes an oscillator 11, that uses a crystal 10 to generate a fundamental frequency of 100 kilocycles, and a harmonic generator 12 that provides output frequencies $f_9$ through $f_{19}$, respectively, to eleven separate buses represented by line 13.

First dividing digital unit A in Figure 3 is also the same as first dividing digital unit A in Figure 2 and has a rotary switch **16*a* with ten terminals connected respectively to the buses 13 that carry harmonics $f_{10}$ through $f_{19}$. A decade frequency divider 17*a* is connected to the pole 18*a* of switch 16*a* to receive a selected harmonic frequency; and a tunable filter 19*a* connects to the output of decade scaler 17*a*** and passes only the fundamental frequency output of the divider which is ¹⁄₁₀ of the selected harmonic frequency.

A knob **21*a* is provided with ten rotational settings as indicated by the adjacent dial plate 22*a*. A shaft means 23*a* is connected to knob 21*a*, to pole 18*a* of switch 16*a*; and to filter 19*a* to provide ten positions for the switch 16*a* and filter 19*a*. It will be noted that only ten frequencies are provided to filter 19*a* which correspond to the ten settings of switch 16*a*. Therefore, no compromise tuning is required for filter 17*a***, and its center frequency at each position should correspond to ¹⁄₁₀ of the the harmonic frequency connected at that position.

The circuitry of the second digital unit B in Figure 3 may be similar to the second digital unit B in Figure 2. However, the tunable filters in the second unit of Figure 3 may have a much narrower band-pass, and thus better selectivity, because compromise tuning is not necessary. As in the other units, second digital unit B has a ten terminal switch **16*b* connected, respectively, to those buses 13 that carry harmonic frequencies $f_9$ through $f_{18}$. A mixer 41*b* receives one input from the pole 16*b* of switch 18*b* and receives another input from the filtered output of first digital unit A. A tunable filter 42*b*, which may have a very narrow band-pass is connected to the output of mixer 41*b* and is tuned to the frequency that is the sum of the two inputs to mixer 41*b*. A decade frequency divider 43*b*, which may be of any of the types described in connection with Figure 2, receives the output of filter 42*b*** and divides its frequency by ten.

Another tunable filter **44*b*, which also may have a very narrow band-pass, filters the output of decade scaler 43*b*** to provide the output of second digital unit B.

A control knob **21*b* is directly connected by a shaft means 46*b* to the pole 18*b* of switch 16*b* so that each of the ten knob positions select one of the ten frequencies $f_9$ through $f_{18}$ as a mixer input. However, knob 21*b* is not directly connected to the tuned elements in digital unit B, but provides tuning information to the tuned elements by means of a differential transmission 47*b*, which has one input shaft 48*b* connected to knob 21*b* and has the other input shaft 49*b* connected to knob 21*a* of first unit A. Thus, differential transmission 47*b* uses the information of prior knob 21*a* and adds together the rotational settings of both knobs 21*a* and 21*b*** to provide tuning information to second digital unit B.

Accordingly, the output shaft **51*b* of the differential 47*b* provides the sum of the two knob inputs. However, a ten-to-one gear ratio is maintained in differential transmission 47*b* so that output shaft 51*b* is rotated only one-tenth as much by first knob 21*a* as by second knob 21*b*, per unit of knob rotation. As a result, filter 42*b* in second unit B will be varied by 100 kilocycles per unit setting of second dial 21*b* and will be varied by 10 kilocycles per unit setting of first knob 21*a*. For example, if knob 21*b* is set at position two and knob 21*a* is set at position zero, output shaft 51*b* of the differential transmission 47*b* will tune filter 42*b* to 1000 kilocycles. Then if first dial 21*a* is moved to position one, filter 42*b* will be tuned to 1010 kilocycles, which is exactly the same as the desired sum frequency. It is therefore apparent that there are one hundred positions obtainable at output shaft 51*b*, due to the various combinations of settings of knobs 21*a* and 21*b*, which can precisely tune filters 42*b* and 44*b*** to any of 100 frequencies.

The filters in Figure 3 can be precisely tuned to each desired frequency and they may be set to the exact sum frequency provided by mixer 41 and the filters may be made with as narrow a band-pass as desired. But, in general, an extremely narrow band-pass is not necessary, because the spacing between a given filtered frequency and the primary spurious frequencies is large, when a standard frequency of 100 kilocycles is used.

The following dividing digital units, which are C, D, E, and F, each may be made identical to the second component unit B; and in a similar manner the outputs of prior units are connected by leads 52 to the mixer input of the following adjacent unit. The ultimate output frequency 40 is taken in Figure 3 from filter **44*f*** in the last digital unit F.

Similarly, each following digital unit has a differential transmission 47 wherein one input shaft 48 is connected to the unit's knob 21 and the another input shaft 49 is connected to the output shaft 51 of the adjacent differential transmission on the right in Figure 3. Also, the output shaft 51 of each differential transmission 47 connects, respectively to the tuned filters 42 and 44 in its digital unit.

An important result of the differential transmission arrangement is that exact tuning information is provided to every filter in the system of Figure 3. The frequencies in each digital unit are not only determined by its own knob setting but are a function of the output frequencies of all prior units. Therefore, in Figure 3, the frequency controlling knobs 21 to the right of a given digital unit are connected to it by all prior differential transmission to provide exact setting information to the given unit. For example, in third digital unit C, there will be one thousand incremental frequencies provided at the output of mixer **41*c*; and differential output shaft 51*c* will provide 1000 incremental positions to filters 42*c* and 44*c*. This can be analyzed by showing that ten positions are provided the immediate knob and ten more are provided by each prior knob through their respective differential transmissions 47 so that in combination 1000 positions are provided at output shaft 51*c* in third unit C. Thus, in the sixth digital unit F, which is the last unit shown in Figure 3, there will be one million discrete output frequencies; and there will be one million discrete shaft positions provided by output shaft 51*f* to permit exact tuning for the filters in sixth digital unit F. It is now apparent that the differential output shaft 51** for a given digital unit will have as many incremental positions as there are incremental frequencies accepted by the given unit.

Figure 3 utilizes only divider digital units and does not use a neutral unit or a multiplier digital unit as was used in Figure 2. Therefore, the maximum range provided by the divider combination in Figure 3 is fixed by the harmonics $f_9$ through $f_{19}$ of the frequency standard, 100 kilocycles, so that the embodiment has an output range from one hundred to two hundred kilocycles, which may be calculated by expression (1) above. Any further number of digital units, identical to second unit B, may be added to further decrease the increment between adjacent frequencies, according to expression (5) above. However, it would not appear desirable, in general, to increase the number of units beyond the point where the increment between adjacent frequencies is less than the stability of the standard frequency. There are, of course, frequency standards known which are more stable than piezoelectric crystals, and they may also be used as the standard frequency in the invention. The system of Figure 3 can be made to have better stability than the system of Figure 2, when they have standard frequencies with the same degree of stability, because the system of Figure 3 can provide better rejection of spurious frequencies which may affect stability.

The circuit in Figure 3 provides an increment between adjacent frequencies of $\frac{1}{10}$ cycles per second. This may be calculated by using formula (5) above where $z$ is five (the power of the radix that provides the standard frequency of 100 kilocycles) and $k$ is six (the number of dividing digital units in Figure 3).

Figure 6:
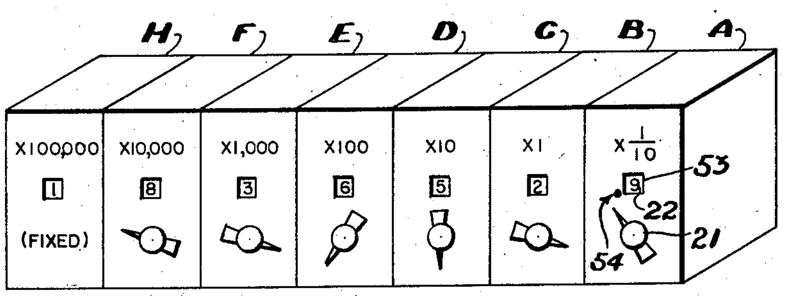
Figure 6 is a perspective view showing a dial indicating system that may be used on a decade form of the invention.

Figure 6 shows a perspective view of one arrangement of the component units described in connection with Figure 3. In this case, the dials 22 are fastened to the knob 21 and are located behind the front panel of each digital unit, which has an opening 53, through which a single number of dial 22 is visible. Thus, a decimal indication of the ultimate output frequency may be directly obtained, which in Figure 6 reads 183,652.9 cycles per second and corresponds to the knob settings in Figure 3. The decimal point 54 assists the reading of the frequency indication of the dials.

Figure 5:
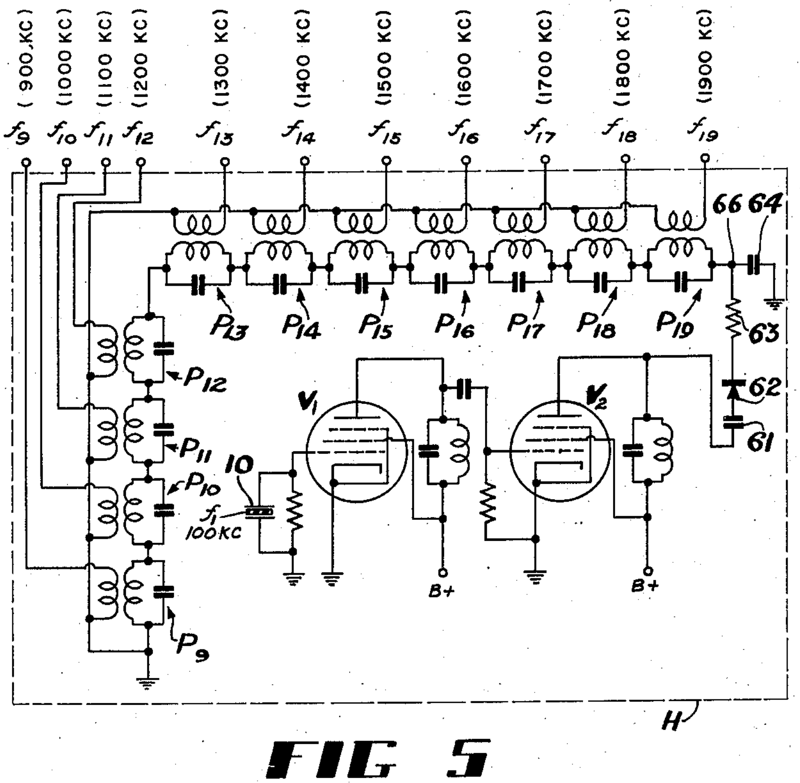
Figure 5 is a detailed schematic diagram of one form of a source component unit that may be used in the block representations of Figures 2 or 3.

Figure 5 shows a detailed schematic diagram of one type of source unit H that may be provided for the block representations in either Figure 2 or Figure 3. The standard frequency is determined by a piezoelectric crystal 10 which connected in the grid circuit of a tube $V_1$ to provide an oscillator that vibrates at one hundred kilocycles per second.

A tube $V_2$ and its circuitry provide a buffer amplifier which is connected to the output of tube $V_1$. The amplified output is provided through a blocking capacitor 61 to a non-linear device which may be a diode 62 to generate a rich harmonic output. A resistor 63 and a capacitor 64 are connected between diode 62 and ground to provide a high-pass filter that substantially attenuates harmonic frequencies less than the ninth harmonic and also to provide a degree of equalization for harmonics, $f_9$ through $f_{19}$.

A plurality of serially connected parallel resonant circuits $P_9$ through $P_{19}$ are connected between filter point 66 and ground. Each resonant circuit includes a capacitor and an inductance, which is the primary of a transformer. First resonant circuit $P_9$ resonates at the ninth harmonic, second resonant circuit $P_{10}$ resonates at the tenth harmonic, etc., and so forth through the last resonant circuit $P_{19}$ which resonates at the nineteenth harmonic. The secondary of each transformer has one side connected to ground and the other side connected to one of the respective buses that comprise bus representation 13 in Figures 2 and 3. The turns ratio of the transformers may also be varied to provide amplitude equalization among the harmonics.

Figures 8, 9:
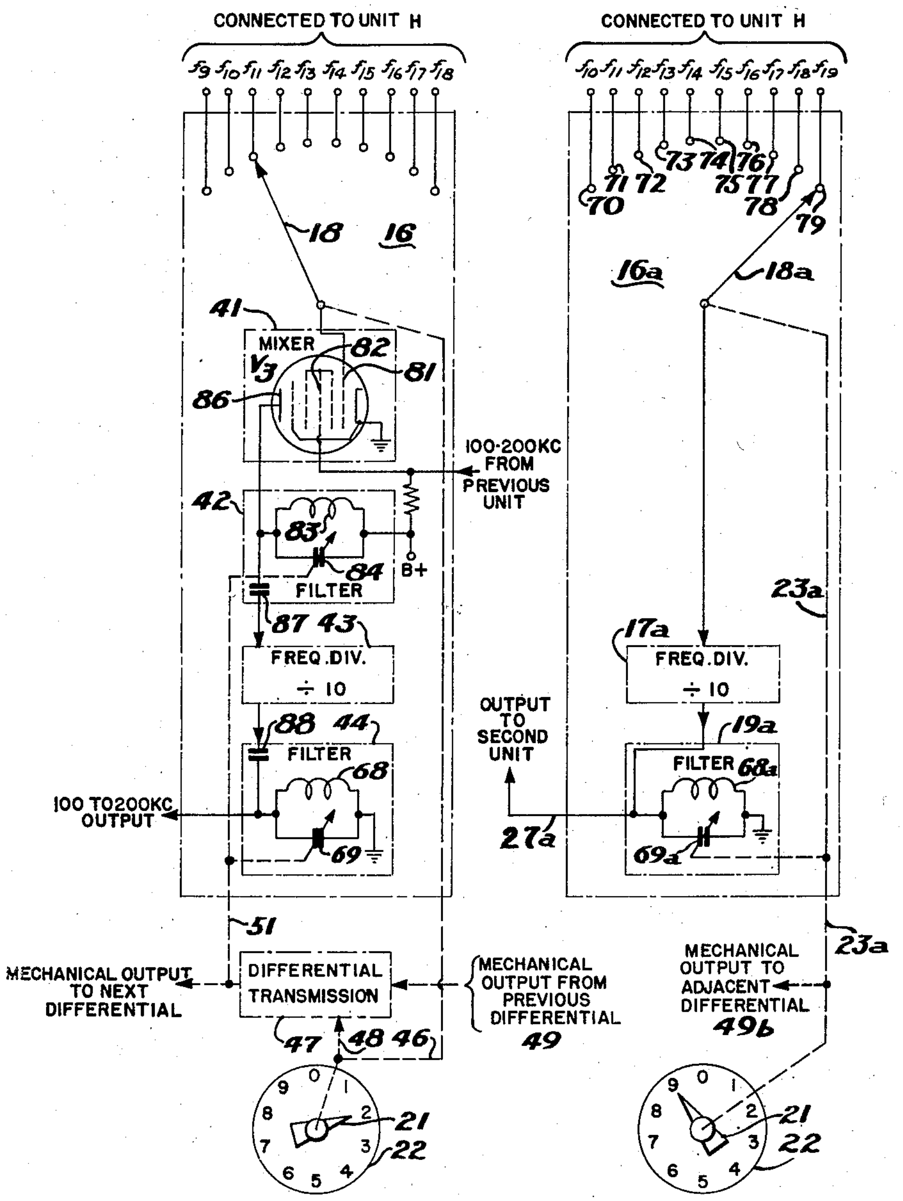
Figure 8 is a detailed schematic diagram of one type of initial "dividing digital component unit" that may be used in the block representation of Figure 3.
Figure 9 is a detailed schematic diagram of any of the "dividing component units" except the first, that may be used in Figure 3.

Figure 9 shows a schematic diagram of the circuitry that may be used in the first digital unit A found in either Figure 2 or Figure 3. As described above, unit A has a rotary switch 16*a* with a pole 18*a* that rotatively engages any one of ten contacts 70 through 79. The contacts connect respectively to source unit H through bus leads carrying frequencies $f_{10}$ through $f_{19}$. As described above, a control knob 21*a* positions pole 18*a* through a shaft means 23*a*. The frequency divider 17*a* has its input side connected to pole 18*a* and divides by ten the harmonic frequency contacted by pole 18*a*. A tunable filter 19*a* is comprised of a fixed inductance 68*a* and a variable condenser 69*a* connected in parallel between ground and the output of decade scaler 17*a*. Capacitor 69*a* is mechanically connected to and positioned by shaft means 23*a*. The lead 27*a*, which is connected to the ungrounded side of filter 19*a*, removes the output from the first digital unit A and connects it to the mixer of the second digital unit B.

The second and each of the remaining units in Figure 3 may be represented by the schematic diagram of Figure 8, since each can be constructed like the other. Figure 8 shows the rotary switch 16 with ten contacts and the pole 18 that rotationally engages the ten contacts which are respectively connected to the buses carrying frequencies $f_9$ through $f_{18}$ provided by source unit H. Pole 18 is controlled directly by the knob 21 by means of shaft means 46.

Mixer 41 in Figure 8 may be comprised of a multigrid tube $V_3$ that has one grid 81 connected to the pole 18 of switch 16 and has another grid 82 connected to the output of the previous unit, which may vary from 100 kilocycles to 200 kilocycles. The filter 42 is a parallel resonant circuit having an inductance 83 and a variable capacitor 84. The filter 42 is the plate load for tube $V_3$ and therefore connects on one side to plate 86 and on the other side to a B plus supply voltage. Capacitor 84 is variable and may vary the center frequency of filter 42 from 1000 to 2000 kilocycles. A bandpass of about ten kilocycles may be used which is readily obtainable for this frequency range with normally available components.

The input to decade frequency divider 43 is connected through a blocking capacitor 87 to the output of filter 42; and a second filter 44 is connected through a blocking condenser 88 to the output of decade scaler 43. Second filter 44 may also consist of an inductor 68 and a variable capacitor 69 that are parallel resonant. Second filter 44 is tunable from 100 kilocycles to 200 kilocycles and may have a band-pass of about one kilocycle to provide the output of the digital unit.

The output shaft 51 of the differential transmission 47 tunes first and second filters 42 and 44 and accordingly connects to capacitors 84 and 69. To enable precise tuning, the differential output adds one mechanical input received from knob 21 to $\frac{1}{10}$ of a second mechanical input received from the output shaft of the previous digital unit and may be expressed mathematically as:

$$D=K+\tfrac{1}{10}P \qquad (6)$$

where D is the angle of rotation for differential output shaft 51; K is the angle of rotation of input shaft 58 provided by knob 21; P is the angle of rotation provided by the other input shaft 49 that is connected to the previous unit; and the factor, one-tenth, is provided by reduction gearing within the differential transmission.

It is thus apparent that the detailed schematics of Figures 5, 8, and 9 can be substituted for the block diagram of Figure 3 to provide a detailed schematic for the synthesizer shown in Figure 3. It is furthermore noted that the filters used in the system are simple and may be component parts of the mixer and frequency divider circuits. It has been calculated that there is no spurious response less than the sixth order within the band-pass of these filters for the stated frequencies.

While the forms of the invention shown in Figures 2 and 3 use a harmonic range from $f_9$ through $f_{19}$, there are many other harmonic ranges which instead may be used in the invention. Table I shows many of the other ultimate output frequency ranges that may be obtained from a system having the same block diagram as shown in Figure 3 and having a one hundred kilocycle frequency standard, but using different sets of harmonics, as may be determined by expressions (1), (2), and (3) above.

*Table I*

| M | Uultimate output frequency range in kilocycles | Limiting harmonics for the set used | $f_d \ldots _t$ harmonic group provided to the first digital unit | $f_a \ldots _k$ harmonic group provided to second and each following digital unit |
|---|---|---|---|---|
| 0 | 0-100 | $f_0$-$f_9$ | $f_0$-$f_9$ | $f_0$-$f_9$. |
| 1 | 100-200 | $f_9$-$f_{19}$ | $f_{10}$-$f_{19}$ | $f_9$-$f_{18}$. |
| 2 | 200-300 | $f_{18}$-$f_{29}$ | $f_{20}$-$f_{29}$ | $f_{18}$-$f_{27}$. |
| 3 | 300-400 | $f_{27}$-$f_{39}$ | $f_{30}$-$f_{39}$ | $f_{27}$-$f_{36}$. |
| Etc. | Etc. | Etc. | Etc. | Etc. |
| M | $Mf_1$ to $(M+1)f_1$. | $[M(R-1)]$ to $[(M+1)R-1]$ | $[M(R-1)]$ and $(R-1)$ consecutive higher harmonics. | $[(M+1)R-1]$ and $(R-1)$ consecutive lower harmonics. |

In Table I, $f_0$ means zero frequency or no output, $f_1$ is the fundamental frequency (standard frequency) and $f_2$ etc. are harmonics of the fundamental frequencies as indicated by their number. The mathematical expressions at the bottom of the respective columns show how each column may be extended without theoretical limit, but a practical limit is found when the frequencies specified are higher than can be handled by available equipment.

The first column in Table I designates the perimeter M which may be used in mathematical expressions (1), (2), and (3). M may be any integer and is selected, in designing a system, to provide a desired frequency range for the system and a desired set of harmonics. When only dividing digital units are used in a system, the term $R^z$ in expression (1) is the same as the standard frequency, $f_1$; and in this case, expression (1) may be rewritten as the following expression:

$$\text{Output frequency range} = Mf_1 \text{ to } (M+1)f_1 \qquad (7)$$

As explained above in connection with expression (3), the harmonics of a set are divided into two groups, $f_a \ldots _k$ and $f_d \ldots _t$. When M is small, many of the harmonics in a set may be common to both groups. But when M is large, it will be found that none of the harmonics of a set will be common to either group, and there may be a discontinuous gap between the harmonics of each group.

The invention may use any radix and provide a directly calibrated system requiring no encoding or decoding. Figure 4 shows the invention using a radix of two, which is the base of the binary number system. In some ways, the radix, two, appears to provide the simplest form of the invention, in that each digital component unit is perhaps in its simplest form. But, on the other hand, the radix, two, requires many more digital units to provide a similar output range than does, for example, a system with a higher radix.

In Figure 4, a standard frequency of 130,872 cycles per second is used by way of example, because this frequency is the closest value in the binary system to the 100,000 cycles per second standard frequency used, by way of example only, in the decade system shown in Figure 3. Thus, there is provided a basis for comparing two forms of the invention having different radixes and having comparable output frequency ranges.

The binary system in Figure 4 requires twenty dividing digital units to obtain an output frequency range of 130,872 cycles per second with incremental steps of one-eighth cycle. This compares to the decade system of Figure 3 which uses six dividing digital units to obtain an output frequency range of 100,000 cycles per second in steps of 1/10 cycle per second.

Hence, it may be realized that although the binary system may provide simpler digital units, it generally requires many more digital units than a decade system to provide the same order of increment between adjacent frequencies over the same order of frequency range.

In Figure 4, a standard frequency of 130,872 cycles per second is provided by a crystal 100 utilized with an oscillator 101. The frequency of 130,872 cycles per second is $2^{17}$. In applying expression (1) above, it is noted that R is two, $z$ is seventeen. Furthermore, M is chosen to be one in Figure 4, and thus the output frequency range will be from 130,872 to 261,744 cycles per second using expression (7) above. Since there are twenty dividing digital units in Figure 4, expression (5) may now be applied wherein $k$ is twenty and $z$ is seventeen to provide an increment between adjacent frequencies of $2^{-3}$ or 1/8 cycle per second.

Since in the form of the invention shown in Figure 4, M has been chosen to be one and R to be two, it may be found from expression (2) above that the harmonics are $f_1$, $f_2$ and $f_3$, which are provided by a harmonic generator H to bus leads 103, 104, and 105, respectively, that together provide a bus representation 13. Of course, frequency $f_1$ could be obtained directly from the output of oscillator 101.

Each digital unit has a double-throw single-pole switch 110. The contacts of switch **110*a* in a first digital unit A connect to bus leads 103 and 104 to receive frequencies $f_2$ and $f_3$, respectively. In the second digital unit B and each following digital unit, the contacts of its switch 110 connect to bus leads 104 and 105** to receive frequencies $f_1$ and $f_2$, respectively.

In regard to first digital unit A, a frequency divider **111*a* has its input connected to pole 112*a* of switch 110*a*. Divider 111*a*** may be any type of frequency divider providing binary division and may be a multivibrator type generally known as a "flip-flop" circuit.

A filter **113*a* is connected to the output of frequency divider 111*a***; and there are only two frequencies to be filtered.

A knob **116*a* may be provided for the first digital unit A to actuate pole 112*a* of switch 110*a* through a shaft means 118*a*. A dial 117*a* is supported adjacent to knob 116*a*** and has the two binary digits, zero and one, at the respective knob positions.

A second digital unit B has a mixer **121*b* with one input connected to the pole 112*b* of switch 110*b* to receive one input, which is a harmonic $f_1$ or $f_2$, and another input, which is the output of first component unit A. A first filter 122*b* receives the output of mixer 121*b* and passes the sum frequency of the mixer inputs. A frequency divider 111*b*, which may be a bistable multivibrator as described for first digital unit A, divides the output of first filter 122*b*** by two.

A second filter **113*b* is connected to the output of divider 111*b*** to filter it and provide the output for second digital unit B.

A second knob **116*b* is provided with a shaft means 118*b* that actuates switch-pole 112*b* and tunes first and second filters 122*b* and 113*b*. A dial 117*b* cooperates with knob 116*b*** to indicate its two binary positions.

First filter **122*b* may be tuned to two frequencies by the two positions of knob 116*b*. Accordingly, when knob 116*b* is at position zero, filter 122*b* must pass either 261,744 or 327,180 cycles per second; and when knob 116*b* is at position one, filter 122*b* must pass either 392,616 or 458,052 cycles per second. Accordingly, filter 122*b*** must be tuned to a compromise frequency as was done in connection with the filters in Figure 2. Here, the compromise frequencies may be about 290 kilocycles at knob position zero and about 425 kilocycles at knob position one. It will be noted that there is a spacing of about 130 kilocycles to the nearest spurious harmonic frequency.

Similarly, second filter **113*b* must be tuned to a compromise frequency when knob 116*b* is at position one, and this frequency may be 212 kilocycles. When knob 116*b* is at position zero, filter 113*b* may be tuned to 145 kilocycles. Filter 113*b*** is used primarily to reject harmonics generated in the frequency divider.

The third, fourth and all succeeding digital units through the twentieth unit T may be similar to the second digital unit B. However, the filters in these digital units must be tuned to compromise frequencies, which may be those given above for the filters in second digital unit B. The frequencies handled by the filters in the succeeding units become increasingly greater in number but they will fall within a band-pass of about 130 kilocycles for filters 122 and about 65 kilocycles for filters 113.

The compromise frequencies for filters 122 and 113 may be avoided, and exact tuning obtained, when a differential transmission system is provided of the type described in connection with Figure 3. Then, the band-pass of the filters may be narrowed to any practical amount.

The dials 117 may be graduated sequentially to the left in increasing powers of two as shown in Figure 4. Hence, a direct digital reading in the binary system may be obtained directly from the dials, as was done with the decade cases of Figures 2 and 3, without any coding or decoding in any case.

While the binary form of the invention shown in Figure 4 uses a harmonic range from $f_1$ through $f_3$, there are many other harmonic ranges that may be used instead, which are indicated in Table II.

*Table II*

| M | Ultimate output frequency range in cycles | Limiting harmonics for the set used | $f_{d \ldots t}$ harmonic group provided to the first digital unit | $f_{a \ldots k}$ harmonic group provided to the second and each following digital unit |
|---|---|---|---|---|
| 0 | 0–130,872 | 0 and $f_1$ | 0–$f_1$ | 0–$f_1$. |
| 1 | 130,872–261,744 | $f_1$, $f_2$, and $f_3$ | $f_2$–$f_3$ | $f_1$–$f_2$. |
| 2 | 261,744–392,616 | $f_2$, $f_3$, and $f_4$ | $f_3$–$f_4$ | $f_2$–$f_3$. |
| 3 | 392,616–523,488 | $f_3$, $f_4$, $f_6$, and $f_7$. | $f_6$–$f_7$ | $f_3$–$f_4$. |
| Etc. | Etc. | Etc. | Etc. | Etc. |
| M | $Mf_1$ to $(M+1)f_1$. | $[M(R-1)]$ to $[(M+1)R-1]$. | $[M(R-1)]$ and $(R-1)$ consecutive higher harmonics. | $[(M+1)R-1]$ and $(R-1)$ consecutive lower harmonics. |

Table II shows a compilation of the specific requirements for a number of binary forms of the invention using dividing digital units only in the manner shown in Figure 4.

A generic form of the invention is shown in Figure 1. It includes a standard frequency, $f_1$, that is defined by the formula:

$$f_1 = R^p \qquad (8)$$

where R is the radix of a chosen number system, and $p$ is any integer power. It is, of course, possible to generate fundamental frequency $f_1$ from any of its multiples or divisibles. For examples, where $f_1$ equals one hundred kilocycles, it might be generated from a 2.5 megacycle crystal by dividing the latter frequency by twenty-five, or, on the other hand, it might be obtained from a twenty-five kilocycle crystal by multiplying its frequency by four.

The digital units used in Figure 1 are of three basic types, which are: dividing digital units, neutral digital units and multiplying digital units. The first dividing digtal unt A exemplfies a special type of dividing digital unit because it does not have a mixer. The remaining dividing digital units B and C contain a mixer 140; but all dividing digital units have a frequency divider 141 that divides by the radix, R. As many dividing digital units similar to unit B may be inserted as required. The neutral unit D has a mixer **140*d*** but does not have a frequency divider or multiplier. The last digital units E and F are multiplying digital units, and each of them has a multiplier that multiplies by the radix, R, carried to a power, which is one for the multiplying unit that connects to the output of the neutral unit, and the power increases by one for each additional multiplying unit progressively removed from the neutral unit.

A harmonic generator H provides a range of harmonic frequencies $f_a$, $f_b$ . . . $f_t$ that are selected according to mathematical expressions (2) and (3) above, where M is preferably one or a larger integer. It is generally preferable not to have M equal zero, because, in this case, undue complications occur in providing proper filtering which are avoided when M equals one or a larger integer. Generally, the filtering is made simpler and a compromise filter system becomes more satisfactory as M is made larger. It is, of course, possible to generate the harmonic frequencies by separate crystals, for example, but some error may be introduced in the harmonic relationship. A group of separate bus leads, represented by line 13 for drawing simplicity, are each connected to receive a separate harmonic of the harmonic set, $f_{a \ldots k}$ and $f_{d \ldots t}$, as defined in connection with mathematical expression (3) above.

Each digital unit has a switch 142 with a single pole 143 and a plurality of contacts that are equal in number to the radix; and thus, there are two contacts in a binary system, three in a ternary, and ten in a decade system, etc.

The contacts of switch **142*a* in first digital unit A connect to the respective bus leads carrying harmonic group $f_{d \ldots t}$. On the other hand, the contacts of the switch 143** in every other digital unit connect to the respective buses carrying harmonic group $f_{a \ldots k}$.

In first unit A, a frequency divider **141*a* has its input connected to the pole 143*a* of switch 142*a*, and frequency divider 141*a* divides the connected harmonic frequency by the radix R. A filter 144*a* is connected to the output of divider 141*a*** and filters it to provide the output of first unit A.

A knob 146 is provided with each digital unit and connects to a shaft means 147 that actuates switch pole 143 to select a desired harmonic and to tune filters in the unit.

A dial 148 is provided with each knob 146 to indicate the setting of the knob. The dial is graduated with the basic numerical digits used in the given number system having the radix R. For example, in the binary system only zero and one are basic digits; in the ternary system, zero, one and two are the basic digits; and in the decade system, zero through nine are the basic digits. Thus, at each different setting of knob 146 a different harmonic is connected by switch 142.

The second digital unit is a dividing unit which has mixer **140*b* with one input connected to pole 143*b* of its switch 142*b* and with the other input connected to the filtered output of first unit A by a lead 151*a***.

A filter **152*b* is connected to the output of mixer 140*b* to select the frequency which is the sum of the mixer input frequencies. The filtered frequency will be spaced from the nearest spurious harmonic frequency by $Mf_1$; and therefore it is apparent that this product should be large enough so that this spurious frequency falls in the attenuating portion of the filter response curve. Filter 152*b* must be tuned to a plurality of compromise frequencies, because at each setting of knob 146*b* a plurality of frequencies may be passed through filter 152*b***. However, exact tuning may be provided by a differential transmission system of the type described in connection with Figure 3, wherein Formula 6 is modified to be $$D = K + \frac{1}{R}P$$

Frequency divider **141*b*, which may be similar to the dividers used in first unit A, receives the output of filter 152*b* and divides it by the radix R. A second filter 153*b* is connected to the output of divider 141*b* and passes the division frequency substantially free of harmonics generated in the divider to provide the output of second unit B by the lead 151*b***.

Third digital unit C is connected by lead **151*b*** to receive the output of second unit B and similarly any number of dividing digital units, similar to second unit B, may be connected consecutively.

The last of the dividing digital units C, shown in dotted form in Figure 1, provides an output to neutral unit D, by the lead 152*c*. Neutral unit D has a mixer 140*d* that receives as one input, the output of the last dividing unit C and receives as another input a harmonic selected by the pole 143*d* of switch 142*d*. The summed output of mixer 140*d* is selected by a filter 154*d* which provided the output of neutral component unit D by a lead 151*d*. Filter 154*d* is tuned to a plurality of compromise frequencies, as was done with prior filters 140.

Neutral unit D has a dial and knob arrangement that is identical to the prior described units in Figure 1, and its shaft means 147*d* similarly connects to filter 154*d* and pole 143*d* to adjust them according to the setting of knob 146*d*.

A multiplying digital unit E is next provided and has a frequency multiplier 156*e* with its input connected to the switch-pole 143*e* to receive a selected harmonic, and multiply its frequency by the radix, R.

A mixer 157*e* receives the multiplied output as one of its inputs and receives as its other input the output of neutral unit D. A filter 158*e* is connected to the output of mixer 157*e* and selects the output that is the sum of the mixer input frequencies to provide the output frequency for multiplying digital unit E. Filter 158*e* is compromise tuned, and its frequencies will be R times the tuned frequencies of divider filter 154*d*. Any number of multiplying digital units, such as the last unit F, that are similar to multiplying unit E may be cascaded from the output of first multiplying unit E as required. Some differences among the individual multiplying digital units are that the multiplication factor of each added multiplying unit is increased by a power of one and thus the second multiplying unit has a multiplication factor of $R^2$; and that the tuning range of the included filter 158 is multiplied by a factor of R over the prior adjacent filter 158. The multiplying units may be added in consecutive order with the output of the previous one providing the input to the next. The last multiplier provides the ultimate output 150 of the synthesizer system.

Of course, no neutral or multiplying units need be used in the system of the invention and then the ultimate output is taken from the last dividing digital unit.

Also, the frequency range of the system may be increased by providing additional harmonic generation means and bus switching means in the source unit H to vary the value of M for the system. In this case, the "fixed" dial 148*h* would be movable and its positions would choose various values of M.

The dials 148 will directly indicate in a digital manner the ultimate output frequency 150 of the system, and the digital indication will be in the numeral system having the selected radix R, without any coding or decoding being provided. The last dial on the left in Figure 1 is provided with a fixed setting determined by the choice of M for a given system. Thus, the digital system described in Figure 2 and in Figure 3, M was one and therefore the fixed dial was set at the digit one. In the binary system of Figure 4, M was chosen to be one; and therefore its fixed dial was set at one. The frequency range limitations described above for a system having only dividing digital units, such as shown in Figure 3 do not pertain to a system having a neutral unit or a neutral unit and multiplying units, because the neutral unit and each added multiplying unit increases the frequency range of the ultimate output by R times.

As stated above, increasing the number of dividing digital units does not affect the frequency range but decreases the frequency increment between adjacent frequencies by 1/R for each added dividing unit. Hence, there is no theoretical limit in the system in regard to a maximum frequency range, which may be increased indefinitely by adding multiplying units, or in regard to the size of the increment between frequencies, which may be decreased indefinitely by adding dividing type units. In practice, there are of course, limitations at both ends. The maximum frequency range will generally be limited by the particular application of the invention but in an extreme case may be limited by the circuitry available for handling the highest output frequencies. The minimum increment will be limited by the stability of the standard frequency source and the type of filters provided.

However, the differential transmission system described in connection with Figure 3 is equally applicable to Figure 1 and when applied will permit exact tuning of each of the tuned elements in all of the component units since the differential system provides information about all previous knob settings to each tunable unit having its particular knob set.

It is apparent to a man skilled in the art, who has thoroughly studied the above disclosure, that numerous and widely differing embodiments, which are defined by the teachings of this disclosure, can be constructed without departing in any sense from the scope of the invention. It is therefore intended that all matter contained in the above description and shown in the accompanying drawings should be interpreted in an illustrative sense and not in a limiting sense, which is done by the following claims.

What is claimed is:

1. Means for synthesizing a large number of frequencies from a given standard frequency including harmonic generating means for generating two groups of harmonics from said standard frequency, the first group of harmonics having R number of consecutive harmonics in which the highest harmonic is $(M+1)R-1$, wherein M is a positive integer, and R is the radix of a given number system, the second group of harmonics having R number of consecutive harmonics in which the lowest harmonic is defined as $M(R-1)$, first frequency dividing means for dividing an input frequency by the number R, first switching means for sequentially connecting said first group of harmonics to the input of said frequency divider, second switching means for sequentially selecting one of said second group of harmonics, means for mixing the sequentially selected output frequency of said second switching means with the output frequency of said first frequency divider, filter means for passing the mixing means output frequency which is the sum of the mixed frequencies, second frequency dividing means with its input connected to the output for said mixing means for dividing the mixed output by the number R, whereby the output frequency of said second frequency divider can be varied in discrete frequency steps by varying the sequential harmonic selection of said first and second switching means.

2. A digital frequency synthesizer using a standard frequency of $R^z$ cycles per second, where R is the radix of a chosen number and $z$ is an integer, comprising harmonic generating means for generating two groups of harmonics from said standard frequency, the first group having R consecutive harmonics in which the highest harmonic is $(M+1)R-1$, wherein M is defined also as an integer, the second group having R consecutive harmonics in which the lowest harmonic is defined as $M(R-1)$, first frequency dividing means for dividing an input frequency by the radix R, first switching means for sequentially connecting said first group of harmonics to the input of said first frequency dividing means, first filter means connected to the output of the first frequency dividing means to selectively pass the divided frequency, mixing means having one input connected to the output of said first filter means, second switching means for sequentially connecting the second group of harmonics to the other input of said mixing means, second filter means connected to the output of said mixing means to pass the sum frequency of the mixed inputs, and second frequency dividing means connected to the output of said second filter means for dividing its output frequency by the radix R, whereby the frequency output of said second frequency dividing means is varied in discrete digital steps when the first and second switching means are switched.

3. A frequency synthesizer capable of providing an ultimate output frequency in the digital terms of a number system having a radix R, comprising means for generating two groups of harmonic frequencies in which each group has R number of consecutive harmonics, the highest harmonic of the first group being $(M+1)R-1$, wherein M is a positive integer, the lowest harmonic of the second group being $M(R-1)$, a plurality of switches, each including a single pole, and R number of contacts, means for respectively connecting the contacts of the first of said switches to said generating means to receive the first group of harmonics, means for respectively connecting the contacts of the other of said switches to said generating means to receive the second group of harmonics, a plurality of frequency dividers wherein each divides an input frequency by the radix R, the first of said frequency dividers having its input connected to the pole of said first switch, a plurality of divider filter means respectively connected to the outputs of said frequency dividers for filtering the respective outputs of said frequency dividers, a plurality of frequency mixing means, each having an input respectively connected to the poles of the remaining of said switches, the other input to each of said mixing means connected to the output of the prior of said divider filter means, a plurality of mixer filter means respectively connected to and filtering the first order summed output frequency of each of said respective mixing means, and the remaining of said frequency dividers respectively connected to the outputs of said mixer filter means, whereby the output of the last of said divider filter means is varied in discrete frequencies by changing the contacting positions of any of the poles of said switches.

4. A frequency synthesizer for providing discrete output frequencies that may be digitally represented in a number system having a radix of R, comprising a standard frequency of $R^p$ cycles per second, where $p$ is a positive integer, means for generating two groups of harmonics from the standard frequency, wherein each group has R number of consecutive harmonics, the highest harmonic in the first group being defined as $$R(M+1)-1$$

in which M is a positive integer, and the lowest harmonic in the second group being defined as $M(R-1)$; a first digital unit comprising, a single-pole switching means having R number of contacts connected to said generating means to respectively receive the harmonics of the first group, a frequency divider connected to the pole of said switching means for dividing the received harmonic by the radix R, and tunable filtering means connected to the output of said frequency divider to selectively pass its output; a second digital unit comprising, a single-pole switching means having R number of contacts connected to said generating means to respectively receive the harmonics of the second group, a frequency mixing means having one input connected to the pole of said switching means and the other input connected to the output of said filter means of said first digital unit, a first tunable filtering means connected to the output of said mixing means to selectively pass the frequency which is the sum of the mixed inputs, a frequency divider connected to the output of the first filtering means to divide its output frequency by the radix R, and second tunable filter means connected to the divider output, whereby the last filtered divider output frequency may be varied in discrete digital steps by changing the settings of the switching means in the digital units.

5. A system as in claim 4 which also includes, a first shaft means associated with said first digital unit for positioning the pole of its switching means and tuning its filtering means, second shaft means associated with said second digital unit for positioning the pole of its switching means and tuning its first and second filtering means.

6. A system as in claim 5 which further includes, first and second dials calibrated with the basic digits of said number system having the radix R, a first knob connected to the first shaft means and cooperating with said first dial, and a second knob connected to the second shaft means and cooperating with said second dial, wherein the output frequency of the synthesizer may be digitally represented by knob indications on said dials.

7. A system as in claim 4 also including, a differential transmission having, an output shaft, and first and second input shafts, the first input shaft having a transmission ratio of $$\frac{1}{R}$$

to the output shaft, and the second input shaft having a transmission ratio of unity to the output shaft, the second input shaft coupled to the switching means and tunable filtering means of said first digital unit, the first input shaft coupled to the switching means of said second digital unit, and the output shaft coupled to the first and second tunable filtering means of said second digital unit, whereby the filters may be precisely tuned to provide the discrete output frequencies by setting the first and second input shafts.

8. A frequency synthesizer for a decade number system comprising, means for generating two groups of harmonically related frequencies, in which each group has ten consecutive harmonics, the highest harmonic of the first group being $10(M+1)-1$, wherein M is a positive integer, and the lowest harmonic of the second group being 9M; a plurality of switches, each including a single pole and ten contacts, means for respectively connecting the contacts of the first of said switches to said generating means for receiving the first group of harmonics, means for respectively connecting the contacts of each of the other of said switches to said generating means to receive the second group of harmonics, a plurality of frequency dividers wherein each divides an input frequency by ten, the first of said frequency dividers having its input connected to the pole of the first of said switches, a plurality of divider filter means respectively connected to the outputs of said frequency dividers for filtering the respective outputs of said frequency dividers, a plurality of frequency mixing means each having an input respectively connected to the poles of the remaining of said switches, the other input to each of said mixing means connected to the output of the prior of said divider filter means, a plurality of mixer filter means respectively connected to and filtering the first order summed output frequency of said respective mixing means, and the remaining of said frequency dividers respectively connected to the output of said mixer filter means, whereby the output of the last of said divider filter means may be varied in decimal discrete frequencies by changing the contacting positions of the poles of said switches.

9. A decade frequency synthesizer using a single standard frequency that is an integral power of ten, comprising harmonic generating means for generating two groups of harmonics from said standard frequency, the first group having ten consecutive harmonics in which the highest harmonic is $10(M+1)-1$, wherein M is defined as a positive integer, the second group having ten consecutive harmonics in which the lowest harmonic is defined as 9M; first frequency dividing means for dividing an input frequency by ten, first switching means for sequentially connecting said first group of harmonics to the input of said frequency divider, first divider filter means connected to the output of the first frequency dividing means to selectively pass the divided frequency, a mixer having one of its inputs connected to the output of the first divider filter, second switching means for sequentially connecting the second group of harmonics to the other input of said mixer, mixer filter means connected to the output of said mixer to pass the sum frequency of the mixed inputs, second frequency dividing means for dividing an input frequency by ten and having its input connected to the output of the mixer filter means, second divider filter means connected to the output of said second frequency divider to provide decade synthesized output frequencies in response to settings of said first and second switching means.

10. A binary frequency synthesizer comprising, means for generating two groups of harmonically related frequencies, in which each group has two consecutive harmonics, the highest harmonic of the first group being $2(M+1)-1$, wherein M is a positive integer, the lowest harmonic of the second group being M; a plurality of switches, each including a single pole and two contacts, means for respectively connecting the contacts of the first of said switches to the generating means to receive the first group of harmonics, means for respectively connecting the contacts of the other of said switches to said generating means for receiving the second group of harmonics, a plurality of frequency dividers wherein each divides an input frequency by two, the first of said frequency dividers having its input connected to the pole of the first of said switches, a plurality of divider filter means respectively connected to the output of said frequency dividers for filtering the respective outputs of said frequency dividers, a plurality of frequency mixing means each having an input respectively connected to the poles of the remaining of said switches, the other input to said mixing means connected to the output of the prior of said divider filter means, a plurality of mixer filter means respectively connected to and filtering the first order summed output frequency of said respective mixing means, and the remaining of said frequency dividers respectively connected to the outputs of said mixer filter means, whereby the output frequency of the last of said divider filter means may be represented in the binary digital system by the settings of the poles of said switches.

11. A binary frequency synthesizer using a single frequency standard that is an integral power of two, comprising harmonic generating means for generating two groups of harmonics from said standard frequency, the first group having two consecutive harmonics in which the highest harmonic is $2(M+1)-1$, wherein M is defined as a positive integer, the second group having two consecutive harmonics in which the lowest harmonic is defined as M, first frequency dividing means for dividing an input frequency by two, first switching means for sequentially connecting said first group of harmonics to the input of said first frequency dividing means, first divider filter means connected to the output of said first frequency dividing means to selectively pass the divided frequency, a mixer having one of its inputs connected to the output of the first divider filter means, second switching means for sequentially connecting the second group of harmonics to the other input of said first mixer, mixer filter means connected to the output of said mixer to pass the sum frequency of the mixed inputs, second frequency dividing means for dividing the output of said mixer filter means by two, and second divider filter means connected to the output of said second frequency divider to provide a binary synthesized output in response to settings of said first and second switching means.

12. A digital frequency synthesizer system that includes, harmonic generating means for generating a group of harmonically related frequencies having R number of consecutive harmonics in which $R(M+1)-1$ is the highest, R being the radix of the digital system, and M being a positive integer, and a first digital dividing unit having, frequency dividing means for dividing any of said harmonic frequencies by the radix R, switching means having its input connected to said generating means for sequentially connecting said group of harmonics to the input of said frequency divider, means for filtering the divided output of said frequency divider to attenuate spurious frequencies, whereby the filtered divided output provides the finest digital variation in the output frequency of said synthesizer system.

13. A digital frequency synthesizer system having a first digital dividing unit, a second digital dividing unit, and harmonic generating means for generating a group of harmonically related frequencies having R number of consecutive harmonics in which $M(R-1)$ defines the lowest harmonic, R being the radix of the digital system, and M being a positive integer; said second unit including, mixing means having a pair of inputs, one mixer input connected to the output of said first digital dividing unit, switching means for sequentially connecting said group of harmonics to the other input of said mixing means, first means for filtering the first order summed output frequency of said first mixing means, frequency dividing means having its input connected to the output of said first filtering means for dividing the filtered frequency by the number R, and second filtering means connected to the output of said frequency dividing means to selectively pass the divided frequency, whereby the second digital unit adds a digital variation to the output frequency of said synthesizer system.

14. A digital frequency synthesizer system, that includes harmonic generating means for generating a group of harmonically related frequencies having R number of consecutive harmonics in which $M(R-1)$ is the lowest, R being the radix of the digital system, and M being a positive integer; said system also including third and following digital dividing units, each of said digital dividing units comprising, mixing means having a pair of inputs, one mixer input receiving the output of the prior digital dividing unit, switching means for sequentially connecting said group of harmonics to the other input of said mixing means, first means for filtering the first order summed output frequency of said first mixing means, frequency dividing means having its input connected to the output of said first filtering means for dividing the filter frequency by the number R, and second filtering means connected to the output of said frequency dividing means to selectively pass the divided frequency, whereby the third and following digital units each add another digital variation to the output frequency of said synthesizer system.

15. A digital frequency synthesizer system that includes at least one digital dividing unit, a neutral digital unit, and harmonic generating means for generating a group of harmonically related frequencies having R number of consecutive harmonics in which $M(R-1)$ is the lowest, R being the radix of the digital system, and M being a positive integer, said neutral unit comprising, a mixer having a pair of inputs, one input connected to the output of said digital dividing unit, means for sequentially connecting the said harmonic group to the other mixer input, and filtering means connected to the output of said mixer to select the frequency which is the sum of the mixer input frequencies, whereby said neutral digital unit adds another digital variation to the output frequency of said synthesizer system.

16. A digital frequency synthesizer system having harmonic generating means for generating a group of harmonically related frequencies having R number of consecutive harmonics in which $M(R-1)$ is the lowest, R being the radix of the digital system, and M being the positive integer; a neutral unit; and a first multiplier unit, including a frequency multiplier for multiplying a received input frequency by the number R, switching means for sequentially connecting said group of harmonics to the input of said frequency multiplier, mixing means having a pair of inputs, means for connecting one mixing means input to the output of said frequency multiplier, the other input of said mixing means connected to the output of said neutral unit, and filtering means connected to the output of said mixing means to selectively pass the output frequency which is the sum of the mixed input frequency, whereby the first digital multiplying unit adds another digital variation to the output frequency of said synthesizer system.

17. A frequency synthesizer system including harmonic generating means for generating a group of harmonically related frequencies having R number of consecutive harmonics in which $M(R-1)$ is the lowest, R being the radix of the digital system, and M being a positive integer; a plurality of digital multiplying units including first, second and following units, each of said second and following multiplying units comprising, a frequency multiplier for multiplying an input frequency by the number $R^n$, where $n$ is the consecutive count of the frequency multiplier from said first multiplying unit, switching means for sequentially connecting one of said group of harmonics to the input of said frequency multiplier, mixing means having a pair of inputs, means for connecting one mixing means input to the output of said frequency multiplier, the other input of said mixing means connected to the output of the prior digital multiplying unit of said frequency synthesizer system, and filtering means connected to the output of said mixing means to selectively pass the mixer output frequency which is the sum of its input frequencies, whereby the second and following digital multiplying units each add one digital variation to the output frequency of said synthesizer system.

18. A system for digitally synthesizing discrete frequencies from a given standard frequency, including a harmonic generator for generating two groups of harmonic frequencies in which each group has R number of consecutive harmonics of said standard frequency, the highest harmonic of the first group being $(M+1)R-1$, wherein M is a positive integer, and R is the radix of the digital number system, and the lowest harmonic of the second group being $M(R-1)$; a first dividing digital unit including, first frequency divider means for dividing an input frequency by the radix R, first switching means for connecting sequentially said first harmonic group to the input of said first frequency divider means, first tunable divider filtering means connected to the output of said first frequency divider means to provide the output frequency for said first digital unit, and first shaft means connected to said first switching means and first filtering means to select the output of said first digital unit; a second dividing digital unit including, a first mixer receiving the output of the first digital unit as one of its inputs, second switching means for connecting sequentially any one of the harmonics of said second harmonic group to the other input of said first mixer, first tunable mixer filtering means connected to the output of said mixer to select the sum frequency of its inputs, second frequency dividing means connected to the output of said first mixer filtering means to divide its frequency by R, second tunable divider filtering means connected to the output of said second frequency divider to selectively pass the output of said second digital unit, and second shaft means connected to said second switching means and to the tuning means of said mixer filtering means and divider filtering means to control the output of said second digital unit; and a plurality of subsequent dividing digital units constructed as defined above for said second dividing digital unit, the mixer in each subsequent digital unit receiving the output of the preceding unit as one of its inputs, and other switching means connecting sequentially the second group of harmonics to the other mixer input, wherein a large plurality of digitally related frequencies may be obtained as the output of the last digital unit by varying the settings of said shaft means.

19. A system for digitally synthesizing discrete frequencies from a given standard frequency, including a harmonic generator for generating two groups of harmonic frequencies in which each group has R number of consecutive harmonics of said standard frequency, the highest harmonic of the first group being $(M+1)R-1$, wherein M is a positive integer, and R is the radix of the digital number system, and the lowest harmonic of the second group being $M(R-1)$; a first dividing digital unit including, first frequency divider means for dividing a received frequency by the number R, first switching means for connecting sequentially said first harmonic group to the input of said first frequency divider means, first tunable divider filtering means connected to the output of said first frequency divider means to provide the output frequency for said first digital unit, and first shaft means connected to said first switching means and first filtering means to select the output of said first digital unit; a second dividing digital unit comprising, a first mixer receiving the output of the first digital unit as one of its inputs, second switching means for connecting sequentially the harmonics of said second harmonic group to the other input of said first mixer, first tunable mixer filtering means conected to the output of said mixer to select the sum of its input frequencies, second frequency dividing means connected to the output of said first mixer filtering means to divide its frequency by R, second tunable divider filtering means connected to the output of said second frequency divider to selectively pass the output of said second digital unit; a plurality of subsequent dividing digital units constructed as defined above for said second dividing digital unit, the mixer in each subsequent digital unit receiving the output of the preceding unit as one of its inputs, and the other mixer input being connected sequentially to the second group of harmonics, wherein a large plurality of digitally related frequencies may be obtained as the output of the last dividing digital unit.

20. A frequency synthesizer system as defined in claim 19, including a plurality of differential transmission means, each transmission means having first and second input shafts and an output shaft, the transmission ratio of the second input shaft to the output shaft being $$\frac{1}{R}$$

the transmission ratio of the first input shaft to the output shaft being unity, and the output shaft being actuated by the sum of its two input shafts according to their input ratios; the first differential transmission means having its second input shaft connected to said shaft means of said first digital unit, its output shaft connected to said first tunable mixer filter means and said second tunable divider filtering means of said second digital unit to tune them, and its first input shaft connected to said second switching means; the remaining differential transmission means each being connected to a respective one of said subsequent digital units in the same manner as defined above for said first transmission means and said second digital unit, with the second input shaft of each differential transmission means connected to the output shaft of the adjacent prior differential transmission means, whereby the shaft means of said first digital unit providing the smallest digital adjustment in the synthesized output frequency, and the first input shaft of each differential transmission means each providing a separate digital adjustment of the synthesized output frequency.

21. A frequency synthesizer including the system defined in claim 20 and having a neutral digital unit that includes, a frequency mixer with one input connected to the output of the last dividing digital unit, switching means for sequentially connecting the second group of harmonics to the other input of said mixer, and filtering means connected to the output of said mixer to select the sum of the two mixer input frequencies as the output of said neutral unit; another differential transmission means having the same transmission ratios as said other transmission means, the second input shaft of said another differential transmission means connected to the output shaft of the adjacent prior differential transmission means, the output shaft of said another transmission means connected to said neutral unit filtering means to tune it, and the first input shaft of said another transmission means connected to said neutral unit switching means to select the harmonic received by said neutral unit.

22. A frequency synthesizer system including the system defined in claim 21 and having a first digital multiplying unit, that includes frequency multiplying means for multiplying an input frequency by the radix R, switching means for sequentially connecting said second group of harmonics to the input of said multiplying means, frequency mixing means having one input connected to the output of said neutral digital unit and another input connected to the output of said frequency multiplying means, and filter means connected to the output of said mixing means for selecting the sum of its two input frequencies to provide the output frequency of said digital multiplying unit; still another differential transmission means having the same transmission ratio as prior transmission means, and its second input shaft connected to the output shaft of the prior transmission means most directly connected to said neutral digital unit, its output shaft connected to the multiplying unit filter means, and the first input shaft connected to the multiplying unit switching means to select its input harmonic and determine the multiplying unit's digital effect upon the output frequency of said synthesizer system.

23. A frequency synthesizer system including the system defined in claim 21 and having a plurality of digital multiplying units, each multiplying unit including a frequency multiplying means for multiplying an input frequency by the number $R^n$, where $n$ is the number of the multiplying unit determined by counting consecutively from the first multiplying unit which is connected to said neutral unit, switching means for sequentially connecting said second group of harmonics to the input of said multiplying means, frequency mixing means having one input connected to the output of the prior digital unit and another input connected to the output of said frequency multiplying means, and filter means connected to the output of said frequency mixing means for selecting the sum of its two input frequencies to provide the output frequency of the multiplying unit; a further plurality of differential transmission means with one provided with each of said multiplying units, each of said further transmission means having the same transmission ratio as the prior differential transmission means, each further transmission means having its second input shaft connected to the output shaft of the prior differential transmission means, its output shaft connected to the filter means in its multiplying unit, and its first input shaft connected to switching means of its multiplying unit to select its input harmonic and to determine the digital effect of each multiplying unit upon the output frequency of said synthesizer system.

24. A decade system for synthesizing frequencies from a standard frequency, including a harmonic generator for generating two groups of harmonic frequencies in which each group consists of R number of consecutive harmonics of said standard frequency, the highest harmonic of the first group being $10(M+1)-1$, wherein M is a positive integer, and the lowest harmonic of the second group being 9M; a first dividing digital unit including, first frequency divider means for dividing an input frequency by ten, first switching means for connecting sequentially said first harmonic group to the input of said first frequency divider means, first tunable divider filtering means connected to the output of said first frequency divider means to provide the output frequency for said first digital unit, and first shaft means connected to said first switching means and first filtering means to select the output of said first digital unit; a second dividing digital unit including, a first mixer with one of its inputs connected to the output of said first digital unit, a second switching means for connecting any one of the harmonics of said second harmonic group to the other input of said first mixer, first tunable mixer filtering means connected to the output of said mixer to select the output frequency which is the sum of its input frequencies, second frequency dividing means connected to the output of said first mixer filtering means to divide its frequency by ten, and second tunable divider filtering means connected to the output of said second frequency divider to selectively pass the output of said second digital unit, and second shaft means connected to control said second switching means and to tune said first mixer filtering means and said divider filter means; and a plurality of subsequent dividing digital units constructed as defined above for said second dividing digital unit, the mixer in each subsequent digital unit receiving the output of the preceding unit as one of its inputs and the other mixer input being connected sequentially to the second group of harmonics, wherein a large plurality of digitally related frequencies may be obtained as the output of the last dividing digital unit by varying the settings of said shaft means of said digital units.

25. A decade system for synthesizing frequencies from a standard frequency, including a harmonic generator for generating two groups of harmonic frequencies in which each group consists of R number of consecutive harmonics of said standard frequency, the highest harmonic of the first group being $10(M+1)-1$, wherein M is a positive integer, and the lowest harmonic of the second group being 9M; a first dividing digital unit including, first frequency divider means for dividing an input frequency by ten, first switching means for connecting sequentially said first harmonic group to the input of said first frequency divider means, first tunable divider filtering means connected to the output of said first frequency divider means to provide the output frequency for said first digital unit, and first shaft means connected to said first switching means and said first filtering means to select the output of said first digital unit; a second dividing digital unit including, a first mixer with one of its inputs connected to the output of said first digital unit, second switching means for connecting any one of the harmonics of said second harmonic group to the other input of said first mixer, first tunable mixer filtering means connected to the output of said mixer to select the output frequency which is the sum of its input frequencies, second frequency dividing means connected to the output of said first mixer filtering means to divide its frequency by ten, and second tunable divider filtering means connected to the output of said second frequency divider to selectively pass the output of said second digital unit; and a plurality of subsequent dividing digital units constructed as defined above for said second dividing digital unit, the mixer in each subsequent digital unit receiving the output of the preceding unit as one of its inputs and the other mixer input being connected sequentially to the second group of harmonics, wherein a large plurality of digitally related frequencies may be obtained as the output of said system.

26. A frequency synthesizer system as in claim 25, including a plurality of differential transmission means, each transmission means including first and second input shafts and an output shaft, the transmission ratio of the second input shaft to the output shaft being 1:10, the transmission ratio of the first input shaft to the output shaft being unity, and the output shaft being actuated by the sum of its two input shafts according to their input ratio; the first differential transmission means having its second input shaft connected to the shaft means of said first dividing digital unit, its output shaft connected to said first tunable mixer filter means and said second tunable divider filtering means of said second dividing digital unit to tune them, and its first input shaft connected to said second switching means; the remaining differential transmission means each being connected to a respective one of said subsequent digital units in the same manner as defined above for said first transmission means and said second digital unit, with the second input shaft of each differential transmission means connected to the output shaft of the adjacent prior differential transmission means, whereby the shaft means of said first digital unit provides the smallest digital adjustment of the synthesized output frequency, and the first input shaft of each differential transmission means each provides a separate decade digital adjustment of the synthesized output frequency.

27. A frequency synthesizer system including the system defined in claim 26 and having a neutral digital unit that includes, a frequency mixer with one input connected to the output of the last dividing digital unit, switching means for sequentially connecting the second group of harmonics to the other input of said mixer, and filtering means connected to the output of said mixer to select the sum of the two mixer input frequencies as the output frequency of said neutral unit; another differential transmission means having the same transmission ratios as said other transmission means, the second input shaft of said another differential transmission means connected to the output shaft of the adjacent prior transmission means, the output shaft of said another transmission means connected to said neutral unit filtering means to tune it, and the first input shaft of said another transmission means connected to said neutral unit switching means to determine the digital effect of the neutral unit upon the output frequency of said synthesizer system.

28. A frequency synthesizer system including the system defined in claim 27 and having a first digital multiplying unit, that includes frequency multiplying means for multiplying an input frequency by the radix R, switching means for sequentially connecting said second group of harmonics to the input of said multiplying means, frequency mixing means having one input connected to the output of said neutral digital unit and another input connected to the output of said frequency multiplying means, and filter means connected to the output of said mixing means for selecting the sum of its two input frequencies to provide the output frequency of said digital multiplying unit; still another differential transmission means having the same transmission ratio as prior transmission means, and its second input shaft connected to the output shaft of the prior transmission means most directly connected to said neutral digital unit, its output shaft connected to the multiplying unit filter means to tune it, and the first input shaft connected to the multiplying unit switching means to select its input harmonic and determine the multiplying unit's digital effect upon the output frequency of said synthesizer system.

29. A binary system for digitally synthesizing discrete frequencies from a given standard frequency, including a harmonic generator for generating two groups of harmonic frequencies in which each group has two consecutive harmonics of said standard frequency, the highest harmonic of the first group being $2(M+1)-1$, wherein M is a positive integer, and the lowest harmonic in the second group being M; a first dividing digital unit including, first frequency divider means for dividing an input frequency by two, first switching means for connecting sequentially said first harmonic group to the input of said first frequency divider means, first tunable divider filtering means connected to the output of said first frequency divider means to provide the output frequency for said first digital unit, and first shaft means connected to said first switching means and first filter means to select the output of said first digital unit; a second dividing digital unit including, a first mixer with one of its inputs connected to the output of said first digital unit, second switching means for connecting any one of the harmonics of said second harmonic group to the other input of said first mixer, first tunable mixer filtering means connected to the output of said mixer to select the output frequency which is the sum of its input frequencies, second frequency dividing means connected to the output of said first mixer filtering means to divide its frequency by two, and second tunable divider filtering means connected to the output of said second frequency divider to selectively pass the output of said second digital unit; and second shaft means connected to control said second switching means and to tune said first mixer filtering means and said divider filtering means; and a plurality of subsequent dividing digital units constructed as defined above for said second dividing digital unit, the mixer in each subsequent digital unit receiving the output of the preceding unit as one of its inputs and the other input being connected sequentially to the second group of harmonics, wherein a large plurality of digitally related frequencies may be obtained as the output of the last dividing digital unit by varying the settings of said shaft means of the digital units.

30. A binary system for digitally synthesizing discrete frequencies from a given standard frequency, including a harmonic generator for generating two groups of harmonic frequencies in which each group consists of two consecutive harmonics of said standard frequency, the highest harmonic of the first group being $2(M+1)-1$, wherein M is a positive integer, and the lowest harmonic in the second group being M; a first dividing digital unit including, first frequency divider means for dividing an input frequency by two, first switching means for connecting sequentially said first harmonic group to the input of said first frequency divider means, first tunable divider filtering means connected to the output of said first frequency divider means to provide the output frequency for said first digital unit, and first shaft means connected to said first switching means and said first filter means to select the output of said first digital unit; a second dividing digital unit including, a first mixer with one of its inputs connected to the output of said first digital unit, second switching means for connecting sequentially any one of the harmonics of said second harmonic group to the other input of said first mixer, first tunable mixer filtering means connected to the output of said mixer to select the output frequency which is the sum of its input frequencies, second frequency dividing means connected to the output of said first mixer filtering means to divide its frequency by two, and second tunable divider filtering means connected to the output of said second frequency divider to selectively pass the output of said second digital unit; and a plurality of subsequent dividing digital units constructed as defined above for said second dividing digital unit, the mixer in each subsequent digital unit receiving the output of the preceding unit as one of its inputs and the other mixer input being connected sequentially to the second group of harmonics, wherein a large plurality of digitally related frequencies may be obtained as the output of said system.

31. A frequency synthesizer system as in claim 30, including a plurality of differential transmission means, each transmission means having first and second input shafts and an output shaft, the transmission ratio of the second input shaft to the output shaft being ½, the transmission ratio of the first shaft to the output shaft being unity, and the output shaft being actuated by the sum of its two input shafts according to their input ratio; the first differential transmission having its second input shaft connected to the shaft means of said first dividing digital unit, its output shaft connected to said first tunable mixer filtering means and said second tunable divider filtering means of said second dividing digital unit to tune them, and its input shaft connected to said second switching means; the remaining differential transmission means each being connected to a respective one of said subsequent differential units in the same manner as defined above for said first transmission means and said second digital unit, with the second input shaft of each differential transmission means connected to the output shaft of the adjacent prior differential transmission means, whereby the shaft means of said first digital unit provides the smallest binary digtal adjustment in the synthesized output frequency, and the first input shaft of each differential transmission means each provides a separate binary digital adjustment of the synthesized output frequency.

32. A frequency synthesizer including the system defined in claim 31 and having, a neutral digital unit that includes a frequency mixer with one input connected to the output of the last dividing digital unit, switching means for sequentially connecting the second group of harmonics to the other input of said mixer, and filtering means connected to the output of said mixer to select the sum of the two mixer input frequencies as the output frequency of said neutral unit, another differential transmission means having the same transmission ratios as said other transmission means, the second input shaft of said another differential transmission means connected to the output shaft of the adjacent prior differential transmission means, the output shaft of said another transmission means connected to said neutral unit filtering means to tune it, and the first input shaft of said another transmission means connected to said neutral unit switching measn to select the harmonic received by said neutral unit.

33. A frequency synthesizer system including the system defined in claim 32 and having a first digital multiplying unit, that include frequency multiplying means for multiplying an input frequency by the radix R, switching means for sequentially connecting said second group of harmonics to the input of said multiplying means, frequency mixing means having one input connected to the output of said neutral digital unit and another input connected to the output of said frequency multiplying means, and filter means connected to the output of said mixing means for selecting the sum of its two input frequencies to provide the output frequency of said digital multiplying unit; still another differential transmission means having the same transmission ratio as prior transmission means, and its second input shaft connected to the output shaft of the prior transmission means most directly connected to said neutral digital unit, its output shaft connected to the multiplying unit filter means to tune it, and the first input shaft connected to the multiplying unit switching means to select its input harmonic and determine the multiplying unit's digital effect upon the output frequency of said synthesizer system.

34. A decade frequency synthesizing system having a source with a standard frequency $f_1$, comprising a harmonic generator for producing two groups of harmonics from said standard frequency, wherein the first group includes harmonics $f_{10}$, $f_{11}$, $f_{12}$, $f_{13}$, $f_{14}$, $f_{15}$, $f_{16}$, $f_{17}$, $f_{18}$, and $f_{19}$, the second group includes harmonics $f_9$, $f_{10}$, $f_{11}$, $f_{12}$, $f_{13}$, $f_{14}$, $f_{15}$, $f_{16}$, $f_{17}$, and $f_{18}$, a first switch having a single-pole and including ten contacts respectively connected to said generator to receive the harmonics of said first group a first frequency divider having its input connected to the pole of said first switch for dividing its input frequency by ten, first tunable divider filter means connected to the output of the first frequency divider to attenuate spurious frequencies and to pass the divided frequency; a second switch having a single pole and including ten contacts connected respectively to said generator to receive the harmonics of said second group, a first mixer having one input connected to the pole of said second switch and another input connected to the output of said first divider filter means, first tunable mixer filter means connected to the output of said first mixer to select the frequency which is the sum of the mixed input frequencies, a second frequency divider having its input connected to the output of said mixer filter means to divide that output frequency by ten, second tunable divider filter means connected to the output of the second frequency divider to pass the divided frequency, a third switch having a single pole and including ten contacts respectively connected to said generator to receive the second group of harmonics, a second mixer having one of its inputs connected to the pole of said third switch and its other input connected to the output of said second divider filter means, second tunable mixer filter means connected to the output of said second mixer to select the frequency which is the sum of the mixed input frequencies, a third frequency divider having its input connected to the output of said second mixer filter means and dividing it by ten, a third tunable divider filter means connected to the output from said third frequency divider to pass the divided frequency substantially free of spurious frequencies.

35. A system as defined by claim 34 in which the standard frequency $f_1$ is 100 kilocycles per second.

36. A decade frequency synthesis system as defined in claim 34 including, a first shaft means coupled to the pole of said first switch to control its harmonic selection and coupled to said first divider filter means to tune it, a first knob connected to said first shaft means, first indicating means calibrated with the digits zero through nine cooperating with said first knob to indicate the digital effect of the settings of said first knob upon the output of said synthesis system; second shaft means coupled to the pole of said second switch to control its harmonic selection and coupled to said first mixer filter means and said second divider filter means to compromise tune them, a second knob connected to said second shaft means, second indicating means calibrated with the digits zero through nine cooperating with said second knob to indicate the digital effect of the settings of said second knob upon the output of said synthesis system; third shaft means coupled to the pole of said third switch to control its harmonic selection and coupled to said second mixer filter means and said third divider filter means to compromise tune them, a third knob connected to the third shaft means, and third indicating means calibrated with the digits zero through nine cooperating with said third knob to indicate the digital effect of the settings of said third knob upon the output of said synthesis system.

37. A decade frequency synthesis system including the system defined in claim 34, comprising a first shaft means coupled to the pole of said first switch to control its harmonic selection and coupled to said first divider filter means to tune it, a knob connected to said first shaft means, first indicating means calibrated with the digits zero through nine cooperating with said first knob to indicate the digital effect of the settings of said first knob upon the output frequency of said synthesis system; a first differential transmission having an output shaft and a pair of input shafts, the first input shaft having unity transmission ratio to the output shaft, the second input shaft having a ten to one transmission ratio to the output shaft and connected to said first knob, a second knob connected to the first input shaft of said first differential transmission and also connected to the pole of said second switch to control its harmonic selection, the output shaft of said first differential transmission connected to said first mixer filter means and said second divider filter means to precisely tune them, first indicating means calibrated with digits zero through nine cooperating with the second knob to indicate the digital effect of the settings of said second knob upon the output frequency of said synthesis system; a second differential transmission having an output shaft and first and second input shafts connected with the same transmission ratio as said first differential transmission, the second input shaft of said second differential transmission connected to the output shaft of the first differential transmission, a third knob connected to the first input shaft of said second differential transmission and also connected to the pole of said third switch to control its harmonic selection, the output shaft of said second differential transmission connected to said second mixer filter means and said third divider filter means to precisely tune them, and indicating means calibrated with the digits zero through nine cooperating with said third knob to indicate the digital effect of the settings of said third knob upon the output frequency of said synthesis system.

38. A decade frequency synthesis system as defined by claim 37 in which the standard frequency $f_1$ is 100 kilocycles per second.

39. A binary frequency synthesis system comprising means for generating harmonically related frequencies $f_1$, $f_2$, and $f_3$, a first single-pole double-throw switch having its contacts connected respectively to said generating means to receive harmonics $f_2$ and $f_3$, a first frequency divider having its input connected to the pole of said first switch and dividing the selected harmonic by two, first divider filter means connected to the output of said first frequency divider to selectively pass the divided frequency; a second single-pole double-throw switch having its contacts respectively connected to said generating means to receive $f_1$ and $f_2$, a first mixer having one input connected to the pole of said second switch to receive the selected harmonic and having its other input connected to the output of said first divider filter means, a first mixer filter having its input connected to the output of said first mixer to selectively pass the frequency which is the sum of the mixer input frequencies, a second frequency divider connected to the output of said first mixer filter and dividing its frequency by two, second divider filter means connected to the output of said second frequency divider to pass the divided frequency substantially free of spurious frequencies; a third single-pole double-throw switch having its contacts connected respectively to said generating means to receive harmonics $f_1$ and $f_2$, a second mixer having one input connected to the pole of said third switch to receive the selected harmonic and having its other input connected to the output of said second divider filter means, a second mixer filter connected to the output of said second mixer to selectively pass the frequency which is the sum of its input frequencies, a third frequency divider connected to the output of said second mixer filter and dividing the received frequency by two, and third divider filter means connected to the output of said third frequency divider to pass the divided frequency and substantially attenuate spurious frequencies.

40. A system as defined by claim 39 in which said frequency $f_1$ is 130,872 cycles per second.

41. A binary frequency synthesis system as defined by claim 39 and including, a first shaft means coupled to the pole of said first switch to control its harmonic selection and coupled to said first divider filter means to tune it, a first knob connected to said first shaft means, first indicating means calibrated with the digits zero and one cooperating with said first knob to indicate the digital effect of the settings of said first shaft knob upon the output of said synthesis system; second shaft means coupled to the pole of said second switch to control its harmonic selection and coupled to said first mixer filter means and said second divider filter means to compromise tune them, a second knob connected to said second shaft means, second indicating means calibrated with the digits zero and one cooperating with said second knob to indicate the digital effect of the settings of said second knob upon the output of said synthesis system; third shaft means coupled to the pole of said third switch to control its harmonic selection and coupled to said second mixer filter means and said third divider filter means to compromise tune them, a third knob connected to the third shaft means, and third indicating means calibrated with the digits zero and one cooperating with said third knob to indicate the digital effect of the settings of said third knob upon the output of said synthesis system.

42. A binary frequency synthesis system including the system defined by claim 39 and including, a first shaft means coupled to the pole of said first switch to control its harmonic selection and coupled to said first divider filter means to tune it, a knob connected to said first shaft means, first indicating means calibrated with the digits zero and one cooperating with said first knob to indicate the digital effect of the settings of said first knob upon the output frequency of said synthesis system; a first differential transmission having an output shaft and a pair of input shafts, the first input shaft having unity transmission ratio to the output shaft, the second input shaft having a two to one transmission ratio to the output shaft and connected to said first knob, a second knob connected to the first input shaft of said first differential transmission and also connected to the pole of said second switch to control its harmonic selection, the output shaft of said first differential transmission connected to said first mixer filter means and said second divider filter means to precisely tune them, first indicating means calibrated with the digits zero and one cooperating with said second knob to indicate the digital effect of the settings of said second knob upon the output frequency of said synthesis system; a second differential transmission having an output shaft and first and second input shafts connected with the same transmission ratio as said first differential transmission, the second input shaft of said second differential transmission connected to the output shaft of said first differential transmission, a third knob connected to the first input shaft of said second differential transmission and also connected to the pole of said third switch to control its harmonic selection, the output shaft of said second differential transmission connected to said second mixer filter means and said third divider filter means to precisely tune them, and indicating means calibrated with the digits zero and one cooperating with said third knob to indicate the digital effect of the settings of said third knob upon the output frequency of said synthesis system.

43. A system as defined by claim 42 in which said frequency $f_1$ is 130,872 cycles per second.

References Cited in the file of this patent

UNITED STATES PATENTS 2,617,039 Young ---------------- Nov. 4, 1952

UNITED STATES PATENT OFFICE
CERTIFICATE OF CORRECTION

Patent No. 2,829,255

April 1, 1958

Victor W. Bolie

It is hereby certified that error appears in the printed specification of the above numbered patent requiring correction and that the said Letters Patent should read as corrected below.

Column 2, line 46, for "none" read -- nine --; column 3, line 8, for "thich" read -- which --; column 9, line 43, strike out "the", second occurrence --; column 12, line 52, for "58" read -- 48 --; column 29, line 6, for "digtal" read -- digital --; line 27, for "measn" read -- means --.

Signed and sealed this 21st day of April 1959.

(SEAL)

Attest:

KARL H. AXLINE

Attesting Officer

ROBERT C. WATSON
Commissioner of Patents